(12) United States Patent
Kawamura

(10) Patent No.: US 8,630,045 B2
(45) Date of Patent: Jan. 14, 2014

(54) ZOOM LENS AND IMAGING APPARATUS

(75) Inventor: Daiki Kawamura, Saitama (JP)

(73) Assignee: Fujifilm Corporation, Tokyo (JP)

( * ) Notice: Subject to any disclaimer, the term of this patent is extended or adjusted under 35 U.S.C. 154(b) by 59 days.

(21) Appl. No.: 13/161,095

(22) Filed: Jun. 15, 2011

(65) Prior Publication Data

US 2011/0304923 A1  Dec. 15, 2011

(30) Foreign Application Priority Data

Jun. 15, 2010  (JP) .................................. 2010-135905

(51) Int. Cl.
*G02B 15/14* (2006.01)

(52) U.S. Cl.
USPC ............................. 359/687; 359/680; 359/683

(58) Field of Classification Search
USPC ......................................... 359/687, 680–682
See application file for complete search history.

(56) References Cited

U.S. PATENT DOCUMENTS

| | | | |
|---|---|---|---|
| 6,049,431 A | 4/2000 | Tochigi | |
| 7,589,909 B2 | 9/2009 | Ikeda | |
| 7,623,300 B2 * | 11/2009 | Hoshi | 359/687 |
| 7,738,185 B2 | 6/2010 | Ohtake et al. | |
| 8,218,238 B2 | 7/2012 | Hagiwara | |
| 8,218,246 B2 * | 7/2012 | Hagiwara | 359/687 |
| 8,228,616 B2 | 7/2012 | Hagiwara | |
| 2012/0268832 A1 * | 10/2012 | Chen | 359/686 |

FOREIGN PATENT DOCUMENTS

| | | |
|---|---|---|
| JP | 62-24213 | 2/1987 |
| JP | 7-209580 | 8/1995 |
| JP | 2009-003342 | 1/2009 |
| JP | 2010-237456 | 10/2010 |
| JP | 2010-256845 | 11/2010 |
| JP | 2011-039374 | 2/2011 |

OTHER PUBLICATIONS

Japanese Official Action—2010-135905—Oct. 22, 2013 (partial translation).

* cited by examiner

*Primary Examiner* — Jordan Schwartz

(74) *Attorney, Agent, or Firm* — Young & Thompson

(57) ABSTRACT

A zoom lens includes a positive first-lens-group, which is fixed during zooming, a negative second-lens-group, which is moved during zooming, a positive third-lens-group, which is fixed during zooming, and a positive fourth-lens-group, which is moved during zooming, these lens groups being arranged in this order from the object side. The first-lens-group consists of four lenses of a negative first-group first lens, a positive first-group second lens, a positive first-group third lens, and a positive first-group fourth lens, arranged in this order from the object side. The first-group first lens and the first-group second lens are arranged in such a manner that a space is formed therebetween. Further, the following formula (1) is satisfied:

$$-2.0 < (R11r + R11f)/(R11r - R11f) < -0.4 \quad (1),$$

where
R11$f$ is a radius of curvature of an object-side surface of the first-group first lens, and
R11$r$ is a radius of curvature of an image-side surface of the first-group first lens.

21 Claims, 27 Drawing Sheets

EXAMPLE 1

EXAMPLE 1
TELEPHOTO END

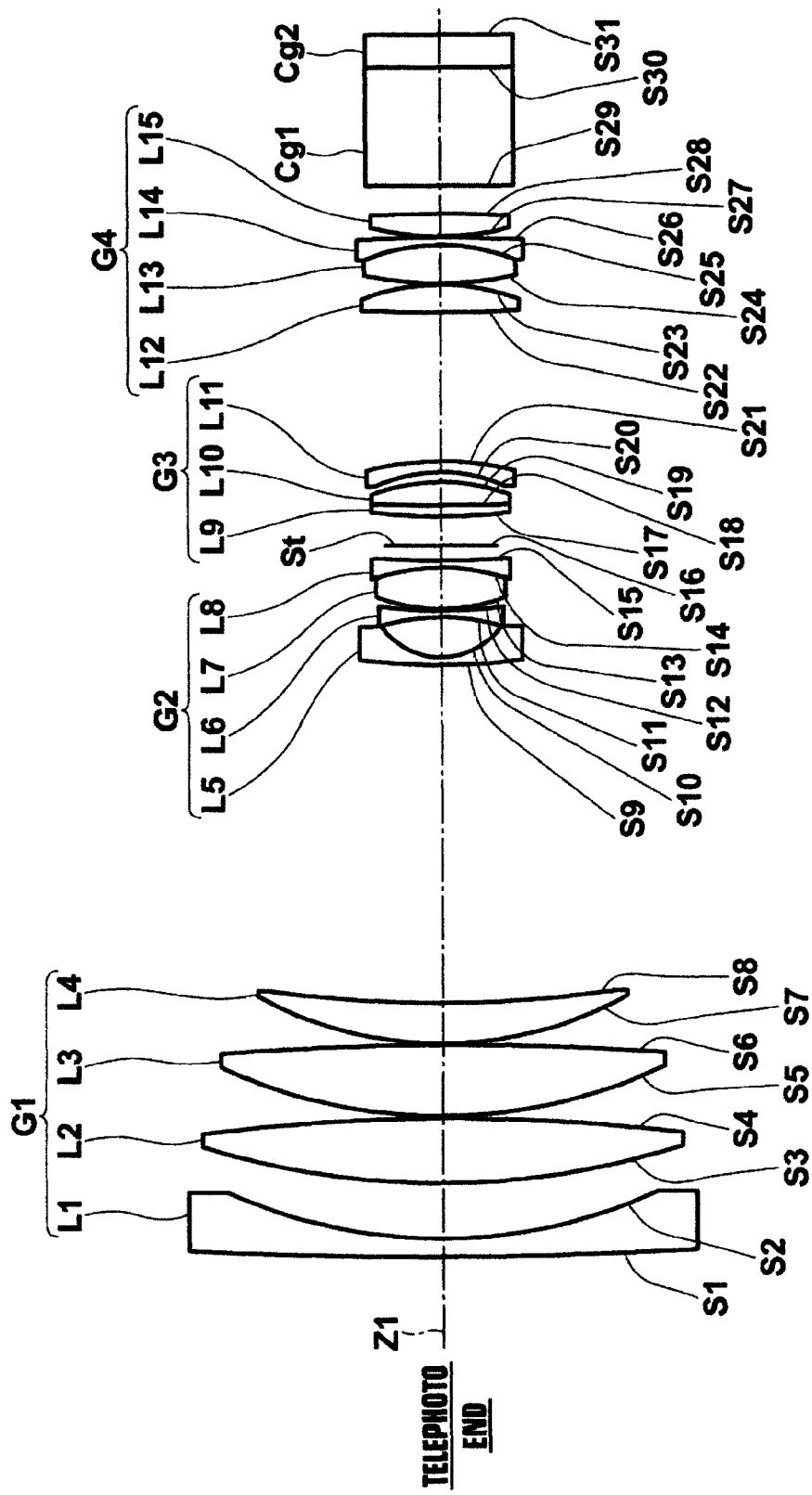
FIG.3A EXAMPLE 2

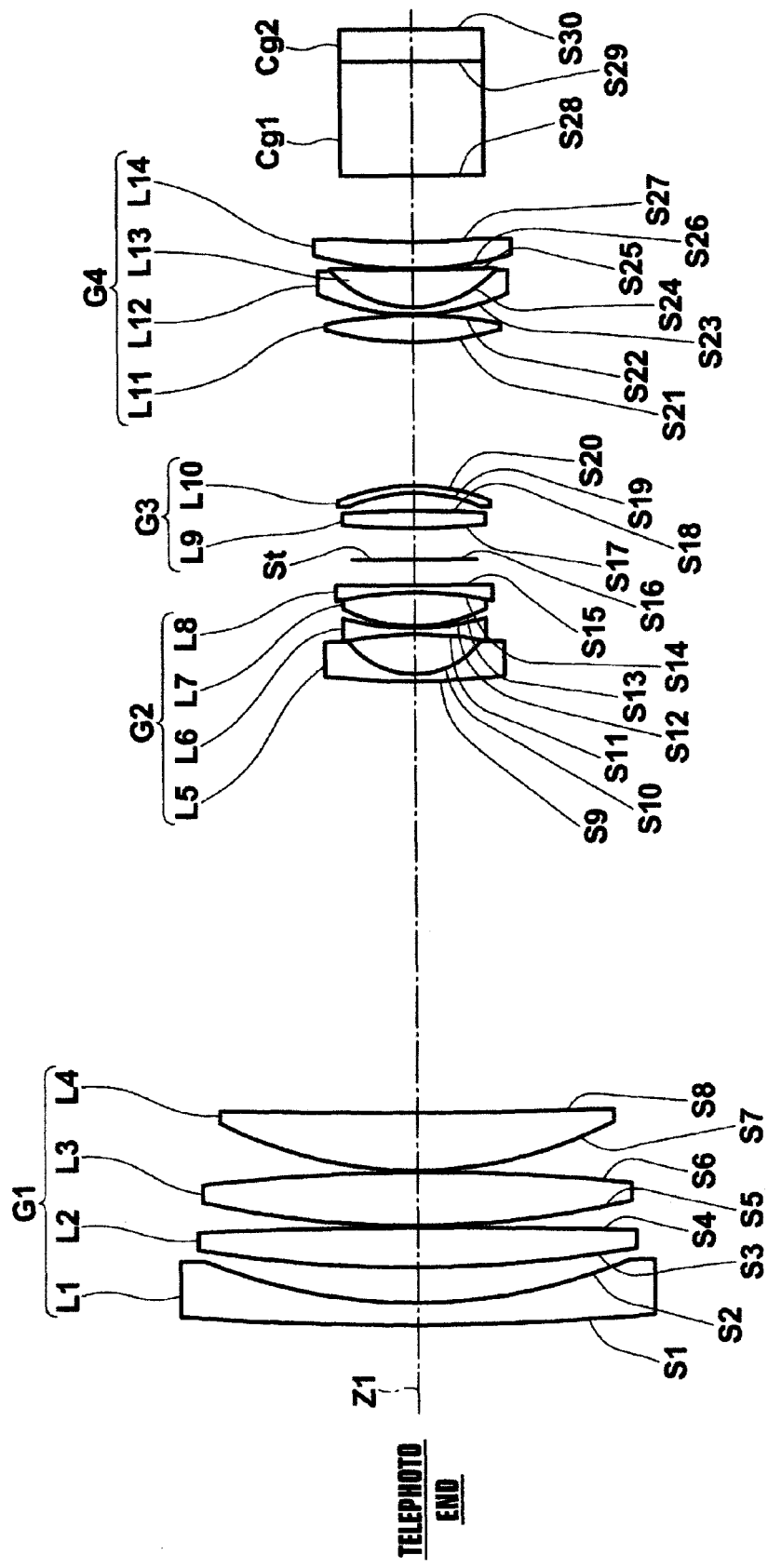

EXAMPLE 3

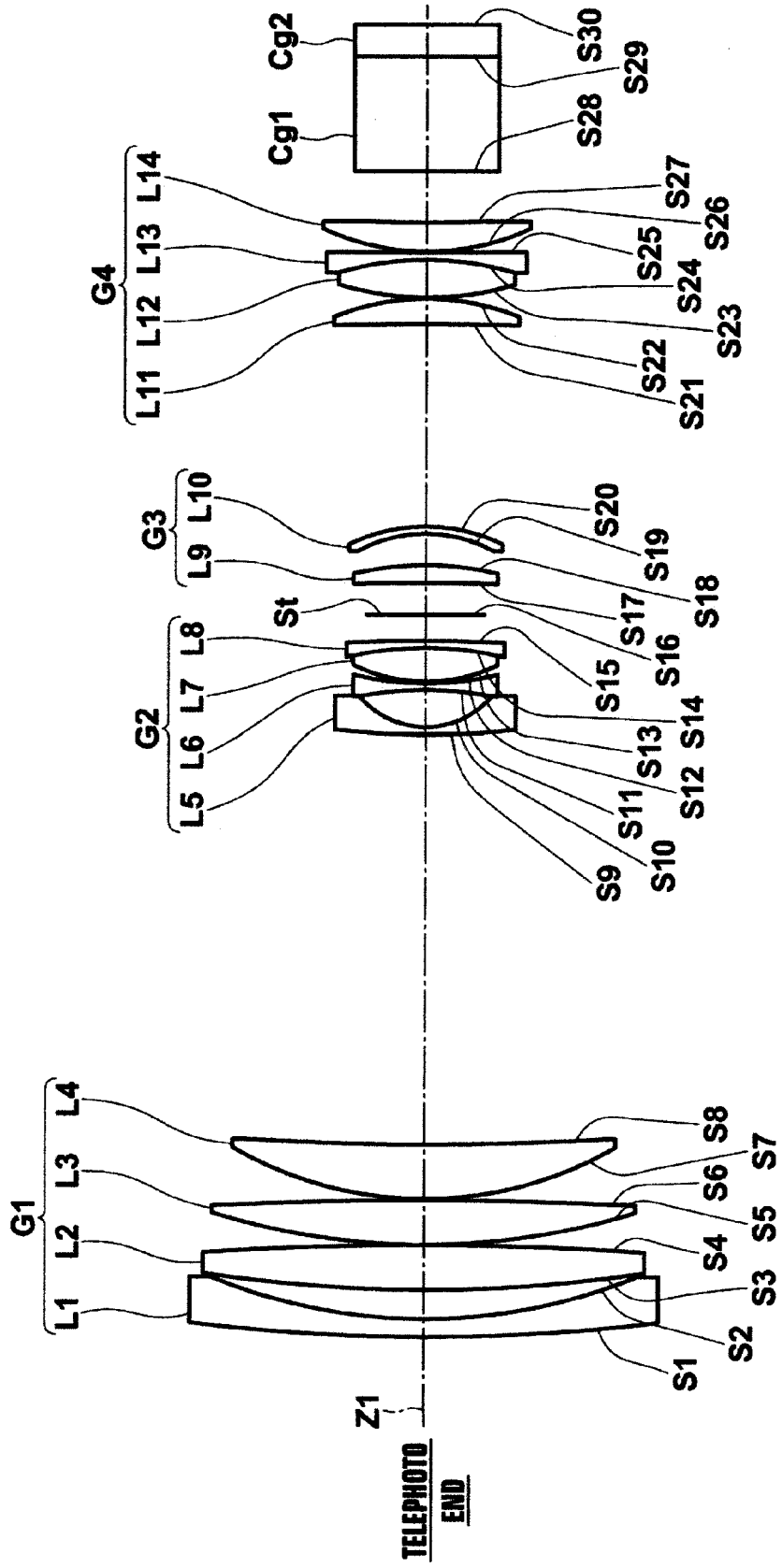

EXAMPLE 4

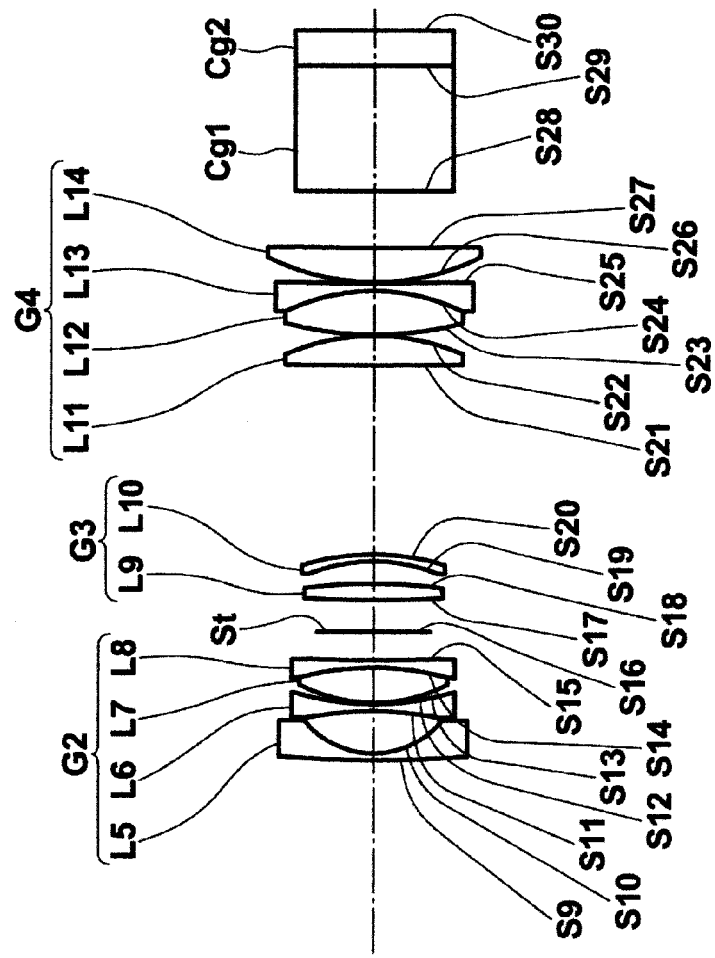
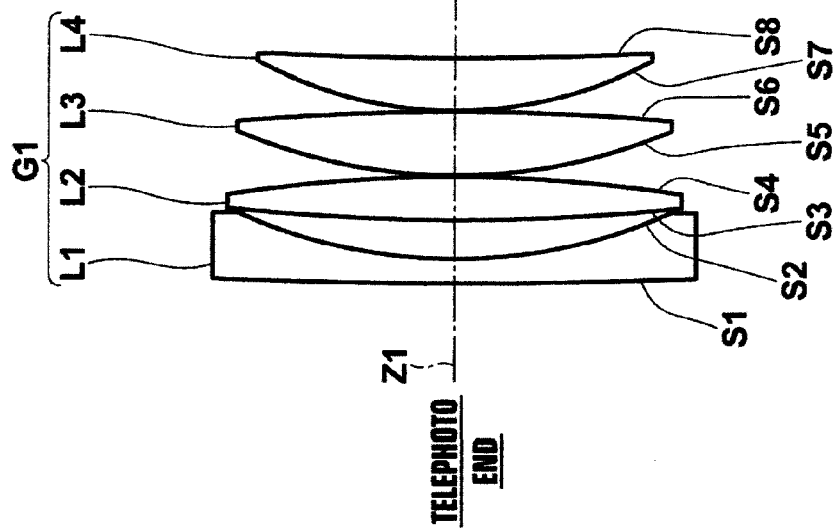
FIG.6A
EXAMPLE 5

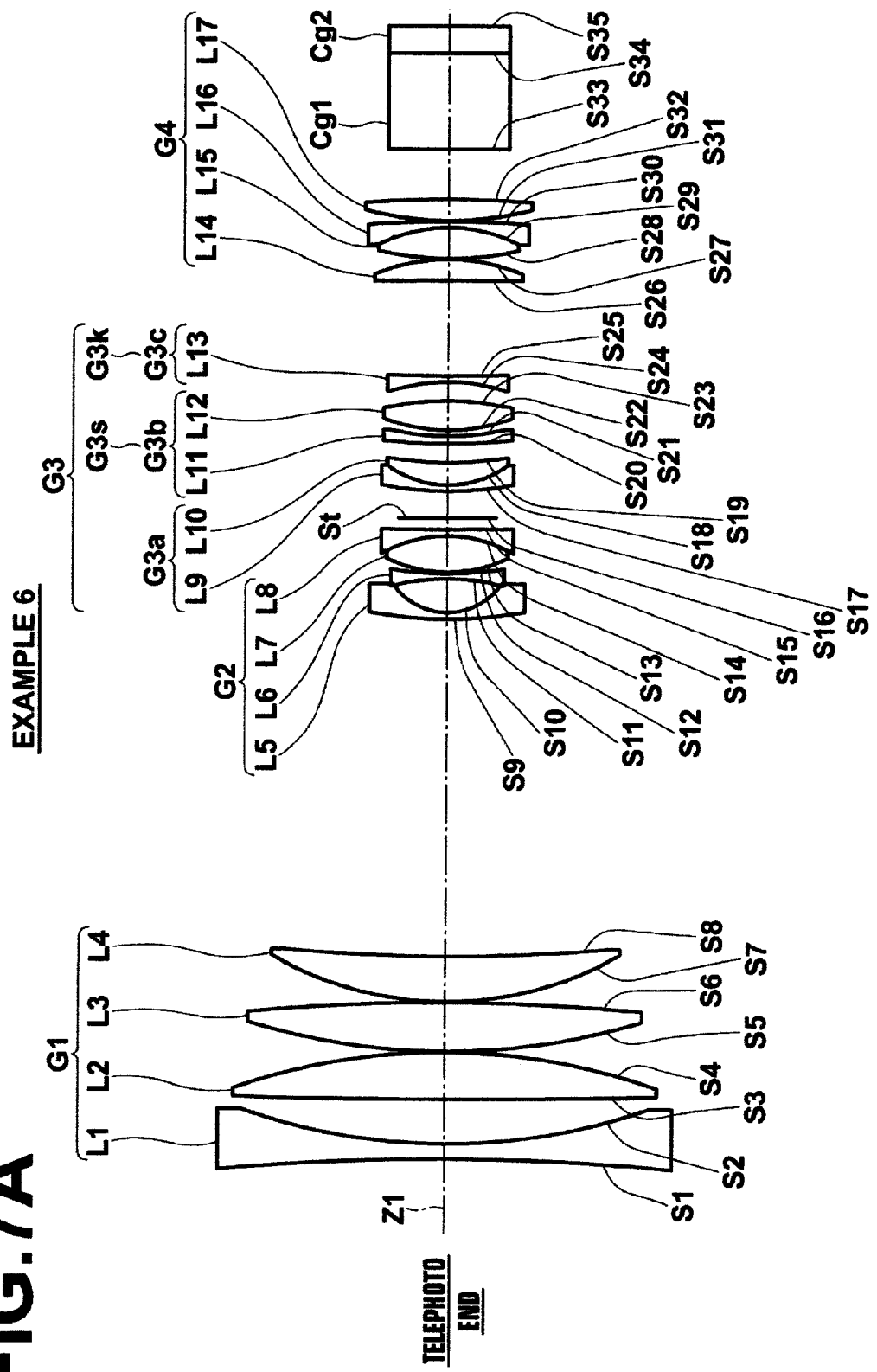

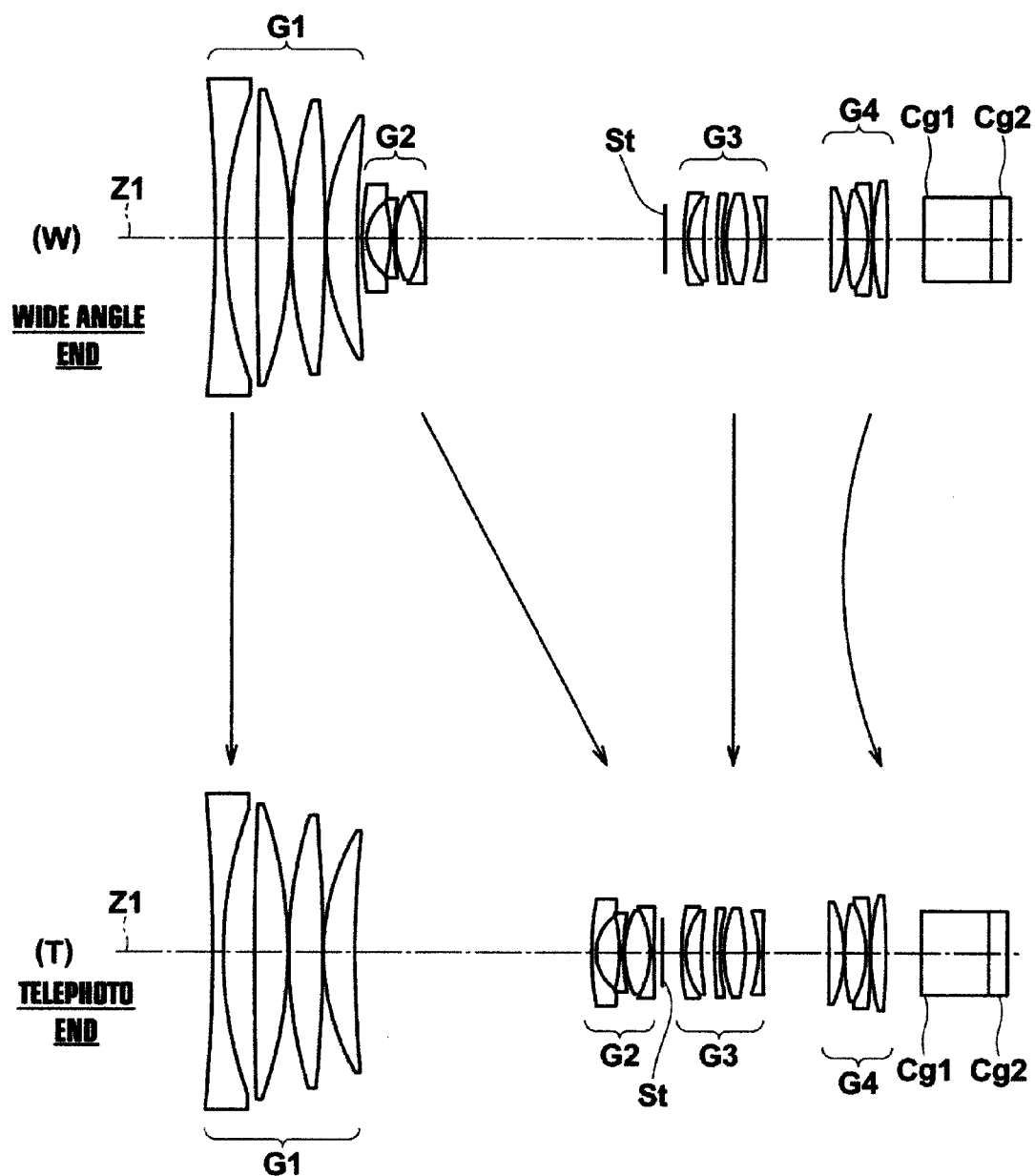

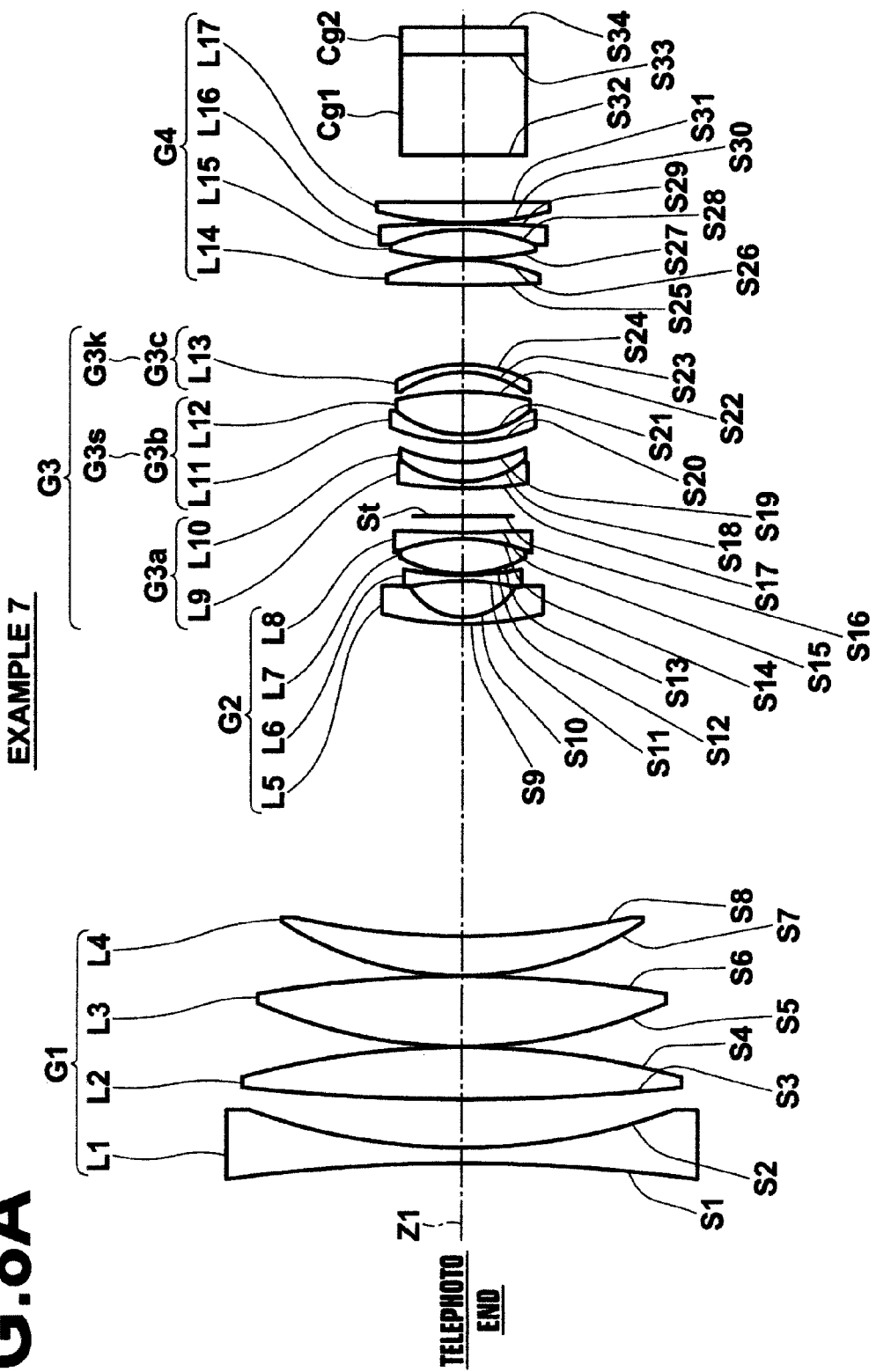

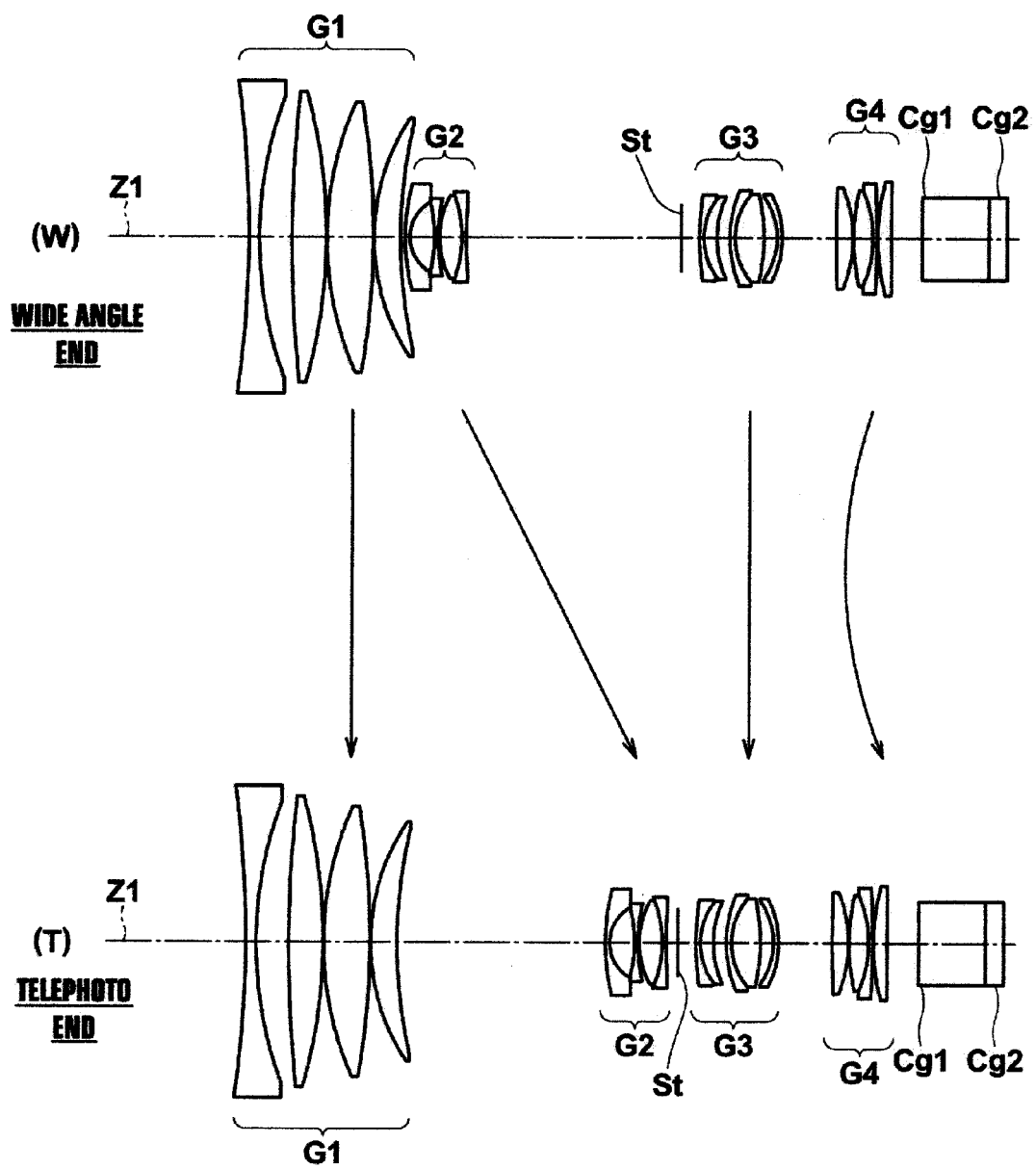

EXAMPLE 8

EXAMPLE 1

WIDE ANGLE END

Fno. = 1.65

-0.2mm  0.2mm
SPHERICAL
ABERRATION

——587.6nm
-----460.0nm
—·—615.0nm

ω= 36.6°

-0.1mm  0.1mm
ASTIGMATISM

——SAGITTAL
-----TANGENTIAL

ω= 36.6°

-5%  5%
DISTORTION

ω= 36.6°

-10μm  10μm
LATERAL
CHROMATIC
ABERRATION

-----460.0nm
—·—615.0nm

TELEPHOTO END

Fno. = 2.88

-0.2mm  0.2mm
SPHERICAL
ABERRATION

——587.6nm
-----460.0nm
—·—615.0nm

ω= 2.0°

-0.1mm  0.1mm
ASTIGMATISM

——SAGITTAL
-----TANGENTIAL

ω= 2.0°

-5%  5%
DISTORTION

ω= 2.0°

-10μm  10μm
LATERAL
CHROMATIC
ABERRATION

-----460.0nm
—·—615.0nm

EXAMPLE 2

WIDE ANGLE END

SPHERICAL ABERRATION
—— 587.6nm
----- 460.0nm
—-— 615.0nm

ASTIGMATISM
—— SAGITTAL
----- TANGENTIAL

DISTORTION

LATERAL CHROMATIC ABERRATION
----- 460.0nm
—-— 615.0nm

TELEPHOTO END

SPHERICAL ABERRATION
—— 587.6nm
----- 460.0nm
—-— 615.0nm

ASTIGMATISM
—— SAGITTAL
----- TANGENTIAL

DISTORTION

LATERAL CHROMATIC ABERRATION
----- 460.0nm
—-— 615.0nm

EXAMPLE 3

WIDE ANGLE END

Fno. = 1.65

-0.2mm   0.2mm
SPHERICAL
ABERRATION

—— 587.6nm
----- 460.0nm
--- 615.0nm

ω = 39.6°

-0.1mm   0.1mm
ASTIGMATISM

—— SAGITTAL
----- TANGENTIAL

ω = 39.6°

-5%   5%
DISTORTION

ω = 39.6°

-10μm   10μm
LATERAL
CHROMATIC
ABERRATION

----- 460.0nm
--- 615.0nm

TELEPHOTO END

Fno. = 2.88

-0.2mm   0.2mm
SPHERICAL
ABERRATION

—— 587.6nm
----- 460.0nm
--- 615.0nm

ω = 2.0°

-0.1mm   0.1mm
ASTIGMATISM

—— SAGITTAL
----- TANGENTIAL

ω = 2.0°

-5%   5%
DISTORTION

ω = 2.0°

-10μm   10μm
LATERAL
CHROMATIC
ABERRATION

----- 460.0nm
--- 615.0nm

EXAMPLE 4

WIDE ANGLE END

Fno. = 1.66

-0.2mm   0.2mm
SPHERICAL
ABERRATION

—— 587.6nm
----- 460.0nm
—·— 615.0nm

ω = 34.9°

-0.1mm   0.1mm
ASTIGMATISM

—— SAGITTAL
----- TANGENTIAL

ω = 34.9°

-5%   5%
DISTORTION

ω = 34.9°

-10μm   10μm
LATERAL
CHROMATIC
ABERRATION

----- 460.0nm
—·— 615.0nm

TELEPHOTO END

Fno. = 2.88

-0.2mm   0.2mm
SPHERICAL
ABERRATION

—— 587.6nm
----- 460.0nm
—·— 615.0nm

ω = 1.9°

-0.1mm   0.1mm
ASTIGMATISM

—— SAGITTAL
----- TANGENTIAL

ω = 1.9°

-5%   5%
DISTORTION

ω = 1.9°

-10μm   10μm
LATERAL
CHROMATIC
ABERRATION

----- 460.0nm
—·— 615.0nm

EXAMPLE 5

WIDE ANGLE END

Fno. = 1.65

-0.2mm  0.2mm
SPHERICAL
ABERRATION

— 587.6nm
----- 460.0nm
--- 615.0nm

ω = 36.5°

-0.1mm  0.1mm
ASTIGMATISM

— SAGITTAL
----- TANGENTIAL

ω = 36.5°

-5%  5%
DISTORTION

ω = 36.5°

-10μm  10μm
LATERAL
CHROMATIC
ABERRATION

----- 460.0nm
--- 615.0nm

TELEPHOTO END

Fno. = 2.88

-0.2mm  0.2mm
SPHERICAL
ABERRATION

— 587.6nm
----- 460.0nm
--- 615.0nm

ω = 3.0°

-0.1mm  0.1mm
ASTIGMATISM

— SAGITTAL
----- TANGENTIAL

ω = 3.0°

-5%  5%
DISTORTION

ω = 3.0°

-10μm  10μm
LATERAL
CHROMATIC
ABERRATION

----- 460.0nm
--- 615.0nm

EXAMPLE 6

WIDE ANGLE END

——587.6nm
-----460.0nm
—--—615.0nm

——SAGITTAL
-----TANGENTIAL

-----460.0nm
—--—615.0nm

TELEPHOTO END

——587.6nm
-----460.0nm
—--—615.0nm

——SAGITTAL
-----TANGENTIAL

-----460.0nm
—--—615.0nm

EXAMPLE 7
WIDE ANGLE END
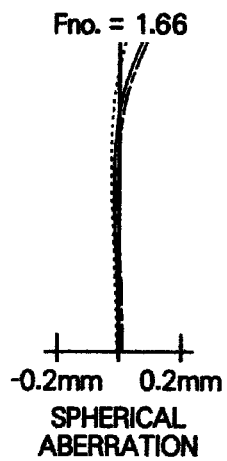
Fno. = 1.66
-0.2mm 0.2mm
SPHERICAL
ABERRATION
FIG. 16A
—— 587.6nm
----- 460.0nm
——— 615.0nm
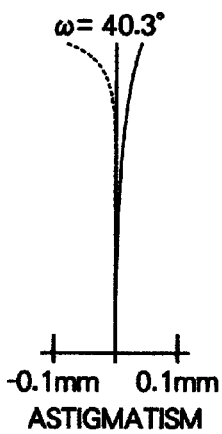
ω = 40.3°
-0.1mm 0.1mm
ASTIGMATISM
FIG. 16B
—— SAGITTAL
----- TANGENTIAL
ω = 40.3°
-5% 5%
DISTORTION
FIG. 16C
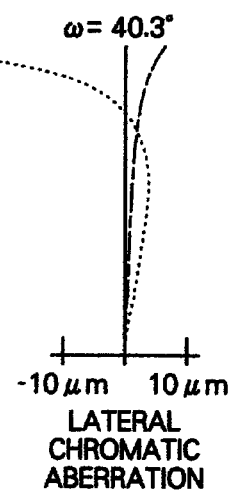
ω = 40.3°
-10μm 10μm
LATERAL
CHROMATIC
ABERRATION
FIG. 16D
----- 460.0nm
——— 615.0nm
TELEPHOTO END
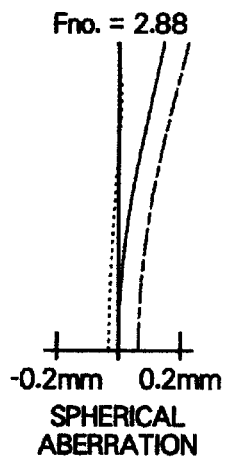
Fno. = 2.88
-0.2mm 0.2mm
SPHERICAL
ABERRATION
FIG. 16E
—— 587.6nm
----- 460.0nm
——— 615.0nm
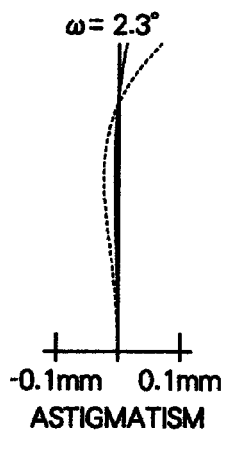
ω = 2.3°
-0.1mm 0.1mm
ASTIGMATISM
FIG. 16F
—— SAGITTAL
----- TANGENTIAL
ω = 2.3°
-5% 5%
DISTORTION
FIG. 16G
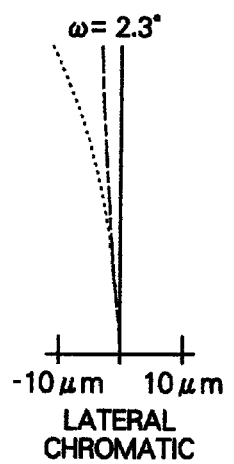
ω = 2.3°
-10μm 10μm
LATERAL
CHROMATIC
ABERRATION
FIG. 16H
----- 460.0nm
——— 615.0nm

EXAMPLE 8

WIDE ANGLE END

Fno. = 1.86

-0.2mm  0.2mm
SPHERICAL
ABERRATION

——587.6nm
-----460.0nm
——615.0nm

ω= 36.4°

-0.1mm  0.1mm
ASTIGMATISM

——SAGITTAL
-----TANGENTIAL

ω= 36.4°

-5%  5%
DISTORTION

ω= 36.4°

-10μm  10μm
LATERAL
CHROMATIC
ABERRATION

-----460.0nm
———615.0nm

TELEPHOTO END

Fno. = 3.20

-0.2mm  0.2mm
SPHERICAL
ABERRATION

——587.6nm
-----460.0nm
——615.0nm

ω= 2.0°

-0.1mm  0.1mm
ASTIGMATISM

——SAGITTAL
-----TANGENTIAL

ω= 2.0°

-5%  5%
DISTORTION

ω= 2.0°

-10μm  10μm
LATERAL
CHROMATIC
ABERRATION

-----460.0nm
———615.0nm

ZOOM LENS AND IMAGING APPARATUS

BACKGROUND OF THE INVENTION

1. Field of the Invention

The present invention relates to a wide-angle zoom lens with high variable magnification, and to an imaging apparatus in which the zoom lens is provided.

2. Description of the Related Art

In recent years, wide-angle zoom lenses with high variable magnification were requested for use in consumer-grade video cameras, cameras for motion picture photography in TV broadcasting, surveillance or monitor cameras for business operations, and the like.

As a zoom lens satisfying such a request, a four-group rear-focus-type zoom lens is widely known (please refer to U.S. Pat. No. 7,738,185 (Patent Document 1)). The four-group rear-focus-type zoom lens is composed of four lens groups of a first lens group having positive refractive power, a second lens group having negative refractive power, a third lens group having positive refractive power, and a fourth lens group having positive refractive power, which are arranged in this order from the object side of the zoom lens. Zooming is performed by moving the second lens group. Further, the fourth lens group is moved in such a manner that a fluctuation of the position of an image plane caused by zooming is corrected so that the zoom lens is focused.

However, in all four-group rear-focus-type zoom lenses available as products, the lens types of the first lens groups and the lens types of the second lens groups closely resemble each other. Further, in most of the available four-group rear-focus-type zoom lenses, one or two lenses having positive refractive power and a cemented lens are arranged in the first lens group (please refer to Patent Document 1).

The zoom lens disclosed in Patent Document 1 has high variable magnification of 20 times or higher. However, the maximum angle of view when the zoom lens is set at wide angle end is approximately 60 degrees, which is not particularly large. When the maximum angle of view of the zoom lens adopting such a lens type should be further increased, the diameter of a front lens of the zoom lens needs to be increased to increase the height of off-axial rays entering the first lens group at wide angle end.

However, in an imaging apparatus adopting such a rear-focus-type zoom lens, if the height of off-axial rays (ray or beam) entering the first lens group is increased to achieve a wide angle of view and high variable magnification at the same time, the size of the optical system becomes large. Therefore, substantially no such zoom lens has been manufactured for sale.

Meanwhile, many kinds of wide conversion lens that can increase the angles of view of zoom lenses without increasing the diameters of front lenses of the zoom lenses have been proposed. For example, a two-element wide conversion lens is known (please refer to Japanese Patent No. 3342157 (Patent Document 2)). In the two-element wide conversion lens, a lens having negative refractive power and a lens having positive refractive power are arranged in this order from the object side.

Further, a wide-angle zoom lens in which the wide conversion lens disclosed in Patent Document 2 and a master lens that is a zoom lens on which the wide conversion lens is mountable are integrated with each other has been proposed. Specifically, an optical system corresponding to the wide conversion lens and an optical system corresponding to the first lens group in the master lens are optimally integrated with each other.

As the wide-angle zoom lens, in which the optical system corresponding to the wide conversion lens and the optical system corresponding to the master lens are assumed to be inseparable from each other, for example, a zoom lens having an extremely wide angle of view (maximum angle of view is 88 degrees) at wide angle end is known (please refer to U.S. Pat. No. 7,589,909 (Patent Document 3)).

In the zoom lenses disclosed in Patent Documents 2 and 3, an afocal optical system having a large air space between a lens group having negative refractive power and a lens group having positive refractive power is adopted. Accordingly, the inclination of rays entering lenses arranged after the afocal optical system is reduced, and a wide angle of view is achieved. In the zoom lens disclosed in Patent Document 2, each of the lens group having negative refractive power and the lens group having positive refractive power, which constitute the afocal optical system, is composed of a lens.

In a zoom lens adopting an afocal optical system to achieve a wide angle of view, as described above, the size of a first lens group even alone is extremely large, and the cost of an apparatus increases. Further, when the variable magnification of such a zoom lens increases, both of the size and the cost of the apparatus further increase. Therefore, the variable magnification of a wide-angle zoom lens adopting the afocal optical system normally remains approximately 8 to 10 times.

Further, a zoom lens including a first lens group composed of four lenses, which are a small number of lenses, and which can achieve a maximum angle of view of approximately 70 to 80 degrees is known (please refer to U.S. Pat. No. 6,049,431 (Patent Document 4) and Japanese Unexamined Patent Publication No. 2009-3342 (Patent Document 5) for example). The major characteristic of these wide-angle zoom lenses is that an air space (gap) is provided between a first-group first lens and a first-group second lens. Meanwhile, in many generally-known wide-angle zoom lenses, a first-group first lens and a first-group second lens are cemented together as in the zoom lens disclosed in Patent Document 1.

The wide-angle zoom lenses disclosed in Patent Documents 4 and 5 effectively use air spaces (air lenses) to correct distortion and curvature of field at wide angle end in an excellent manner. It may be considered that the first lens and the second lens in the wide-angle zoom lenses disclosed in Patent Documents 4 and 5 play similar roles to the role of the wide conversion lens disclosed in Patent Document 2. In Patent Documents 4 and 5, the first lens and the second lens are structured in such a manner to prevent the lens diameter of the first lens group from becoming large. As described, zoom lenses composed of small numbers of lenses, and which can achieve wide angles of view without increasing the lens diameters of the first lens groups are also known.

The sizes of the zoom lenses disclosed in Patent Documents 4 and 5 are small, and wide angles of view of approximately 70 to 80 degrees are achievable. However, the variable magnification of this type of zoom lens is approximately 12 times, which is low.

Therefore, there is a request to increase variable magnification of zoom lenses, as disclosed in Patent Documents 4 and 5, which are small in size but can achieve wide angles of view of approximately 70 to 80 degrees, to approximately 20 times.

However, for example, in the zoom lens disclosed in Patent Document 5, which can achieve a wide angle of view of 80 degrees, the first-group first lens has a double-concave shape having a large curvature. If high variable magnification of 20 times is tried to be obtained in such lens structure, it becomes difficult to balance a curvature of field and distortion at wide angle end and a spherical aberration at telephoto end.

Further, one of problems to be solved in increasing variable magnification is correction of longitudinal chromatic aberrations. For example, in the zoom lens disclosed in Patent Document 5, the Abbe number of the material of each lens having positive refractive power in the first lens group is approximately 50 to 60. If the variable magnification is tried to be increased using the same material for these lenses, chromatic aberrations at telephoto end become extremely large.

Such large chromatic aberrations are generated, because when the power of a lens or lenses having negative refractive power and the power of a lens or lenses having positive refractive power are increased to increase the angle of view, if low-refractive-index low-dispersion material is used as the material of the lenses, it becomes necessary to increase the curvatures of the lenses. Consequently, it becomes difficult to correct aberrations of off-axial rays at wide angle end. To avoid such events, the zoom lens disclosed in Patent Document 5 uses a material having a refractive index of 1.7 or higher, which is a high-refractive-index material. However, use of such a material is disadvantageous to correction of chromatic aberrations. As described above, the zoom lens disclosed in Patent Document 5 may be advantageous to increase an angle of view, but disadvantageous to increase the variable magnification, because correction of chromatic aberrations becomes difficult.

As described above, there is a problem that it is difficult to prevent generation of aberrations in a zoom lens that can achieve a wide angle of view and high variable magnification at the same time without increasing the size of an apparatus by preventing an increase in the lens diameter of the first lens group of the zoom lens and an increase in the number of lenses in the zoom lens.

SUMMARY OF THE INVENTION

In view of the foregoing circumstances, it is an object of the present invention to provide a zoom lens that can achieve a wide angle of view and high variable magnification at the same time without increasing the size of an apparatus, while suppressing aberrations. It is another object of the present invention to provide an imaging apparatus including the zoom lens.

In a zoom lens of the present invention and an imaging apparatus including the zoom lens, the zoom lens is a zoom lens comprising:

a first lens group having positive refractive power, and which is fixed with respect to the direction of an optical axis during zooming (in other words, while magnification is changed);

a second lens group having negative refractive power, and which is moved in the direction of the optical axis during zooming;

a third lens group having positive refractive power, and which is fixed with respect to the direction of the optical axis during zooming; and a fourth lens group having positive refractive power, and which is moved in the direction of the optical axis during zooming in such a manner that a fluctuation of the position of an image plane caused by zooming is corrected so that the zoom lens is focused, and the first lens group, the second lens group, the third lens group and the fourth lens group being arranged in this order from the object side of the zoom lens, wherein the first lens group consists of four lenses (i.e., only four lenses) of a first-group first lens having negative refractive power, a first-group second lens having positive refractive power, a first-group third lens having positive refractive power, and a first-group fourth lens having positive refractive power, which are arranged in this order from the object side, and wherein the first-group first lens and the first-group second lens are arranged in such a manner that a space is formed therebetween, and wherein the following formula (1) is satisfied:

$$-2.0 < (R11r + R11f)/(R11r - R11f) < -0.4 \qquad (1),$$

where

R11f is a radius of curvature of an object-side surface of the first-group first lens, and R11r is a radius of curvature of an image-side surface of the first-group first lens.

When the zoom lens includes a cemented lens composed of n-number of lenses, the number of the cemented lens is counted as n-number.

Further, it is not necessary that a lens group is composed of plural lenses. A lens group may be composed of a single lens.

Further, it is more desirable that the zoom lens of the present invention satisfies the following formula (1') instead of the formula (1):

$$-1.9 < (R11r + R11f)/(R11r - R11f) < -0.4 \qquad (1').$$

A radius of curvature is positive when a surface is convex toward the object side of the zoom lens, and negative when a surface is convex toward the image side of the zoom lens.

It is desirable that the first lens group satisfies the following formula (2):

$$-2.0 < f11/f1 < -1.2 \qquad (2),$$

where f1 is the focal length of the first lens group, and.
f11 is the focal length of the first-group first lens.

It is more desirable that the following formula (2') is satisfied instead of the formula (2):

$$-1.9 < f11/f1 < -1.3 \qquad (2').$$

It is desirable that an Abbe number of at least one of the lenses having positive refractive power in the first lens group with respect to d-line satisfies the following formula (3):

$$65 < vd1p \qquad (3),$$

where vd1p is the Abbe number of at least one of the lenses having positive refractive power in the first lens group with respect to d-line.

It is more desirable that the following formula (3') is satisfied instead of the formula (3):

$$67 < vd1p \qquad (3').$$

It is desirable that the zoom lens satisfies the following formula (4):

$$-2.9 < f2/fw < -1.8 \qquad (4),$$

where fw is the focal length of the entire system of the zoom lens at wide angle end, and f2 is the focal length of the second lens group.

It is more desirable that the following formula (4') is satisfied instead of the formula (4):

$$-2.8 < f2/fw < -1.9 \qquad (4').$$

It is desirable that the zoom lens satisfies the following formula (5):

$$0.55 < f1/ft < 0.88 \qquad (5),$$

where ft is the focal length of the entire system of the zoom lens at telephoto end, and f1 is the focal length of the first lens group.

It is more desirable that the following formula (5') is satisfied instead of the formula (5):

$$0.58 < f1/ft < 0.85 \qquad (5').$$

The second lens group may be composed of three lenses having negative refractive power and a lens having positive refractive power. The second lens group may consist of these four lenses (i.e., only four lenses).

The second lens group may be composed of a second-group first lens having negative refractive power, a second-group second lens having negative refractive power, a second-group third lens having positive refractive power, and a second-group fourth lens having negative refractive power, which are arranged in this order from the object side.

It is desirable that the first lens group satisfies the following formula (6):

$$0.1 < D2/TL1 < 0.4 \qquad (6),$$

where

D2 is an air space between the first-group first lens and the first-group second lens, and TL1 is the thickness of the first lens group.

It is more desirable that the following formula (6') is satisfied instead of the formula (6):

$$0.13 < D2/TL1 < 0.38 \qquad (6').$$

It is even more desirable that the following formula (6") is satisfied:

$$0.13 < D2/TL1 < 0.18 \qquad (6'').$$

It is desirable that the zoom lens satisfies the following formula (7):

$$2.5 < f3/f4 < 6.0 \qquad (7),$$

where f3 is the focal length of the third lens group, and f4 is the focal length of the fourth lens group.

It is more desirable that the following formula (7') is satisfied instead of the formula (7):

$$2.6 < f3/f4 < 5.9 \qquad (7').$$

The fourth lens group may be composed of three lenses having positive refractive power and a lens having negative refractive power. The fourth lens group may consist of these four lenses (i.e., only four lenses).

The third lens group may include a shift lens group that is moved in a direction perpendicular to the optical axis to shift, in the direction perpendicular to the optical axis, an optical image formed through the zoom lens and a fixed lens group that is fixed with respect to the direction perpendicular to the optical axis. Further, the shift lens group may have positive refractive power as a whole, and be composed of two lenses of a lens having positive refractive power and a lens having negative refractive power. Further, the fixed lens group may have negative refractive power as a whole.

Further, the phrase "a direction perpendicular to the optical axis" means a direction that is perpendicular to the optical axis.

Further, the third lens group may be composed of a 3a lens group, a 3b lens group, and a 3c lens group, which are arranged in this order from the object side. Further, the 3a lens group may have positive or negative refractive power as a whole, and be composed of at least one lens having positive refractive power and at least one lens having negative refractive power. The 3b lens group may have positive refractive power as a whole, and be composed of two lenses of a lens having positive refractive power and a lens having negative refractive power. The 3c lens group may have negative refractive power. Further, the 3b lens group may be moved in a direction perpendicular to the optical axis to shift, in the direction perpendicular to the optical axis, an optical image formed through the zoom lens. The 3b lens group may consist of the two lenses (i.e., only two lenses).

An imaging apparatus according to the present invention is an imaging apparatus comprising:

a zoom lens as described above; and an imaging device that images an optical image formed through the zoom lens.

According to the zoom lens of the present invention and the imaging apparatus of the present invention, the first lens group is composed of four lenses, and a gap (air space) is provided between first-group first lens L1 and first-group second L2. Further, a radius of curvature of an object-side surface of the first-group first lens and a radius of curvature of an image-side surface of the first-group first lens are appropriately set. Therefore, a wide angle of view and high variable magnification are achievable, while distortion and a curvature of field generated when zoom setting is in the vicinity of wide angle end and spherical aberrations when zoom setting is in the vicinity of telephoto end are corrected in an excellent manner.

Specifically, it is possible to achieve a wide angle of view and high variable magnification at the same time without increasing the lens diameter and the number of lenses, while suppressing generation of aberrations. Hence, it is possible to realize a small-size zoom lens having a large angle of view and high variable magnification.

The formula (1) defines the shape factor of the first-group first lens. When the zoom lens is structured in such a manner that the value of (R11r+R11f)/(R11r−R11f) is lower than the lower limit defined by the formula (1), it becomes difficult to correct spherical aberrations at telephoto end. In contrast, when the zoom lens is structured in such a manner that the value of (R11r+R11f)/(R11r−R11f) exceeds the upper limit defined by the formula (1), it becomes difficult to correct distortion at wide angle end.

BRIEF DESCRIPTION OF THE DRAWINGS

FIG. 3A is a schematic cross section illustrating the structure of a zoom lens in Example 2;

FIG. 4A is a schematic cross section illustrating the structure of a zoom lens in Example 3;

FIG. 5A is a schematic cross section illustrating the structure of a zoom lens in Example 4;

FIG. 6A is a schematic cross section illustrating the structure of a zoom lens in Example 5;

FIG. 7A is a schematic cross section illustrating the structure of a zoom lens in Example 6;

FIG. 7B is a diagram illustrating, in comparison, the state of the zoom lens at wide angle end and the state of the zoom lens at telephoto end in Example 6;

FIG. 8A is a schematic cross section illustrating the structure of a zoom lens in Example 7;

FIG. 8B is a diagram illustrating, in comparison, the state of the zoom lens at wide angle end and the state of the zoom lens at telephoto end in Example 7;

FIGS. 16A, 16B, 16C and 16D are diagrams illustrating various aberrations (spherical aberration, astigmatism, distortion, and lateral chromatic aberration, respectively) of the zoom lens in Example 7 at wide angle end;

FIGS. 16E, 16F, 16G and 16H are diagrams illustrating various aberrations (spherical aberration, astigmatism, distortion, and lateral chromatic aberration, respectively) of the zoom lens in Example 7 at telephoto end;

DESCRIPTION OF THE PREFERRED EMBODIMENTS

Hereinafter, a zoom lens of the present invention and an imaging apparatus including the zoom lens will be described with reference to drawings.

Figure 1A:
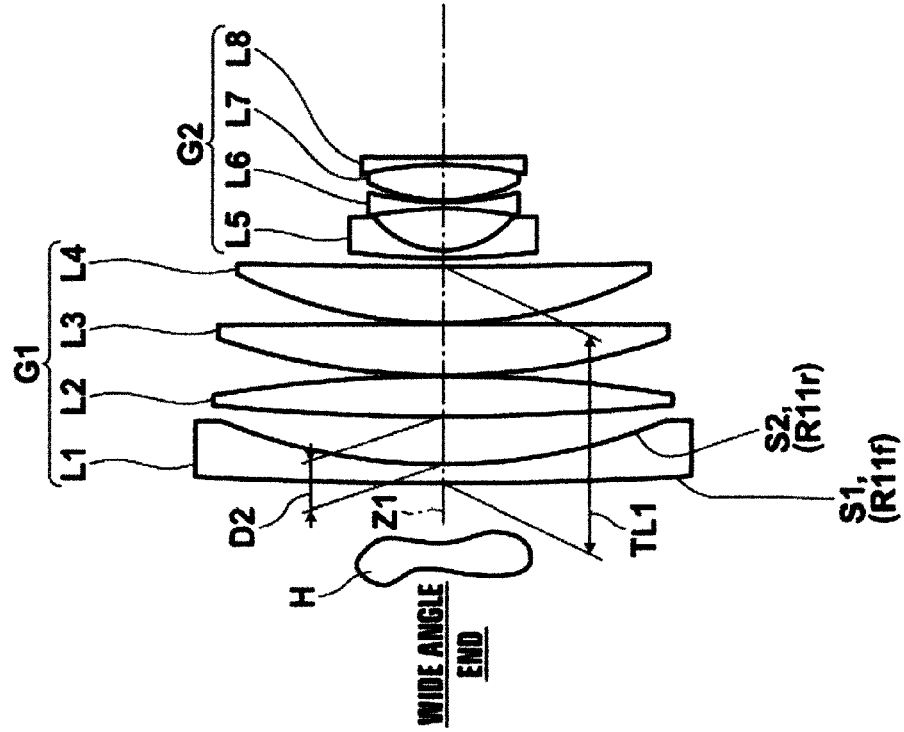
FIG. 1A is a schematic cross section illustrating the structure of an imaging apparatus including a zoom lens according to an embodiment of the present invention.
Figure 1B:
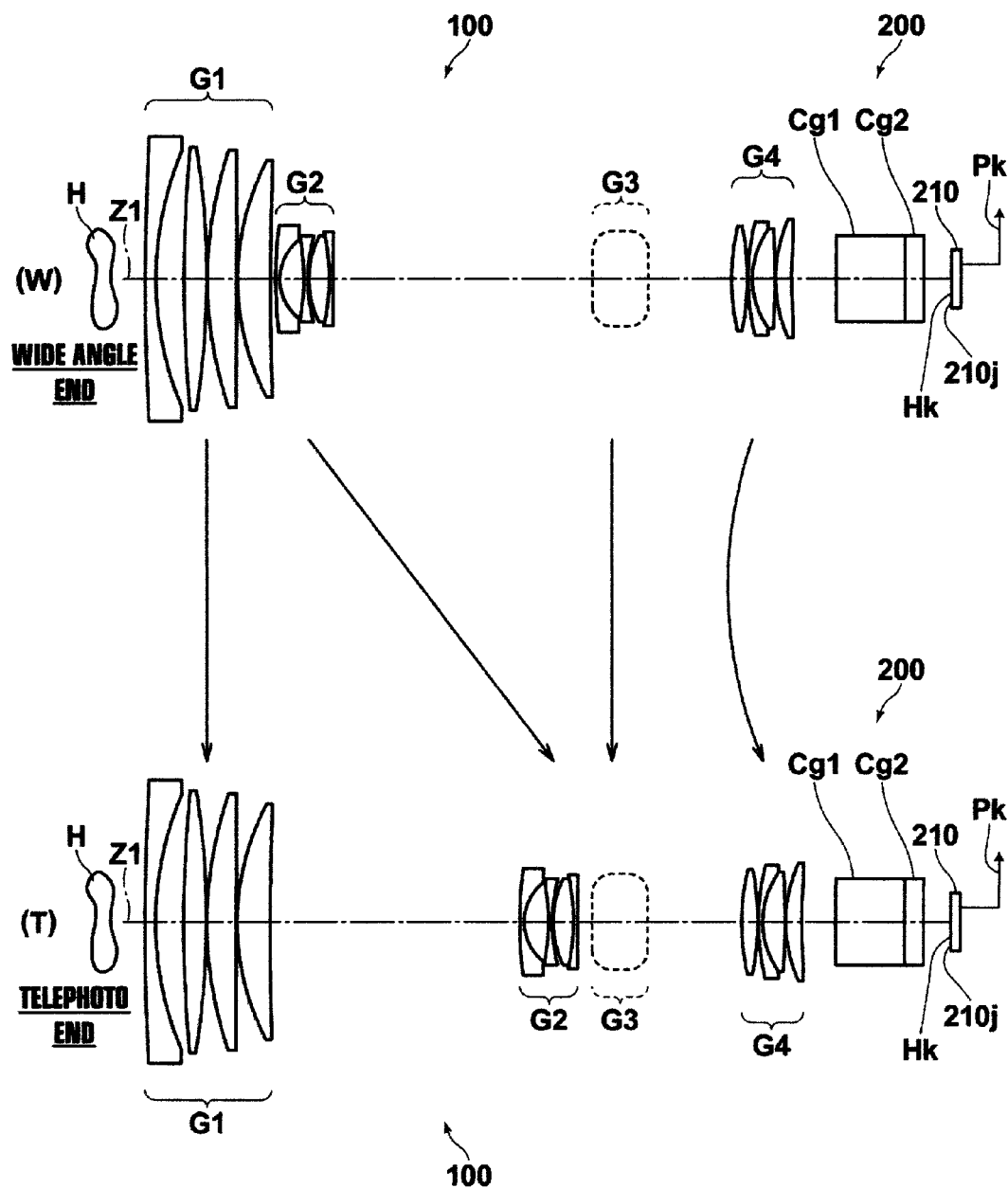
FIG. 1B is a diagram illustrating, in comparison, the state of the zoom lens at wide angle end and the state of the zoom lens at telephoto end in the imaging apparatus.
Figure 2A:
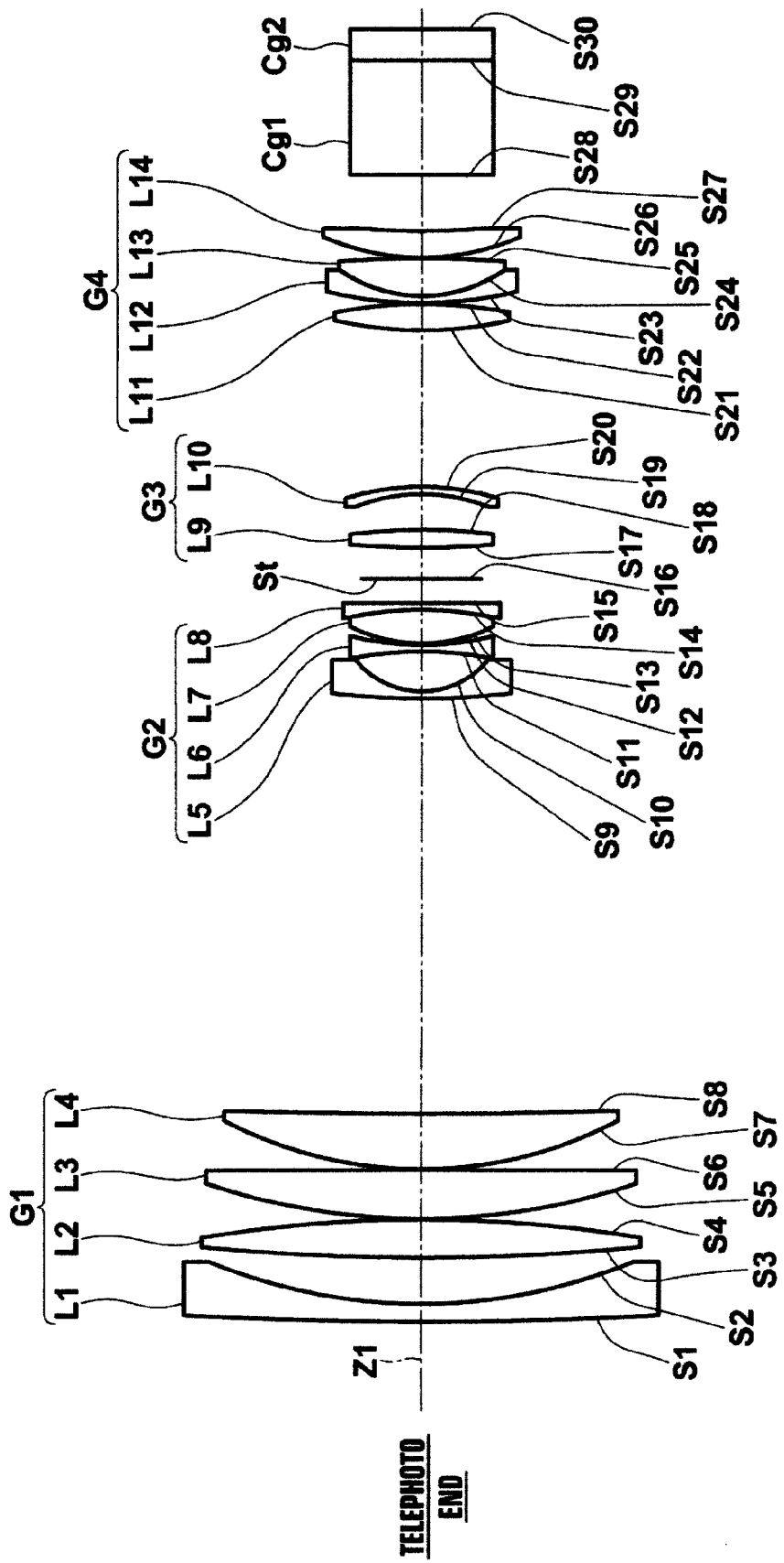
FIG. 2A is a schematic cross section illustrating the structure of a zoom lens in Example 1.
Figure 2B:
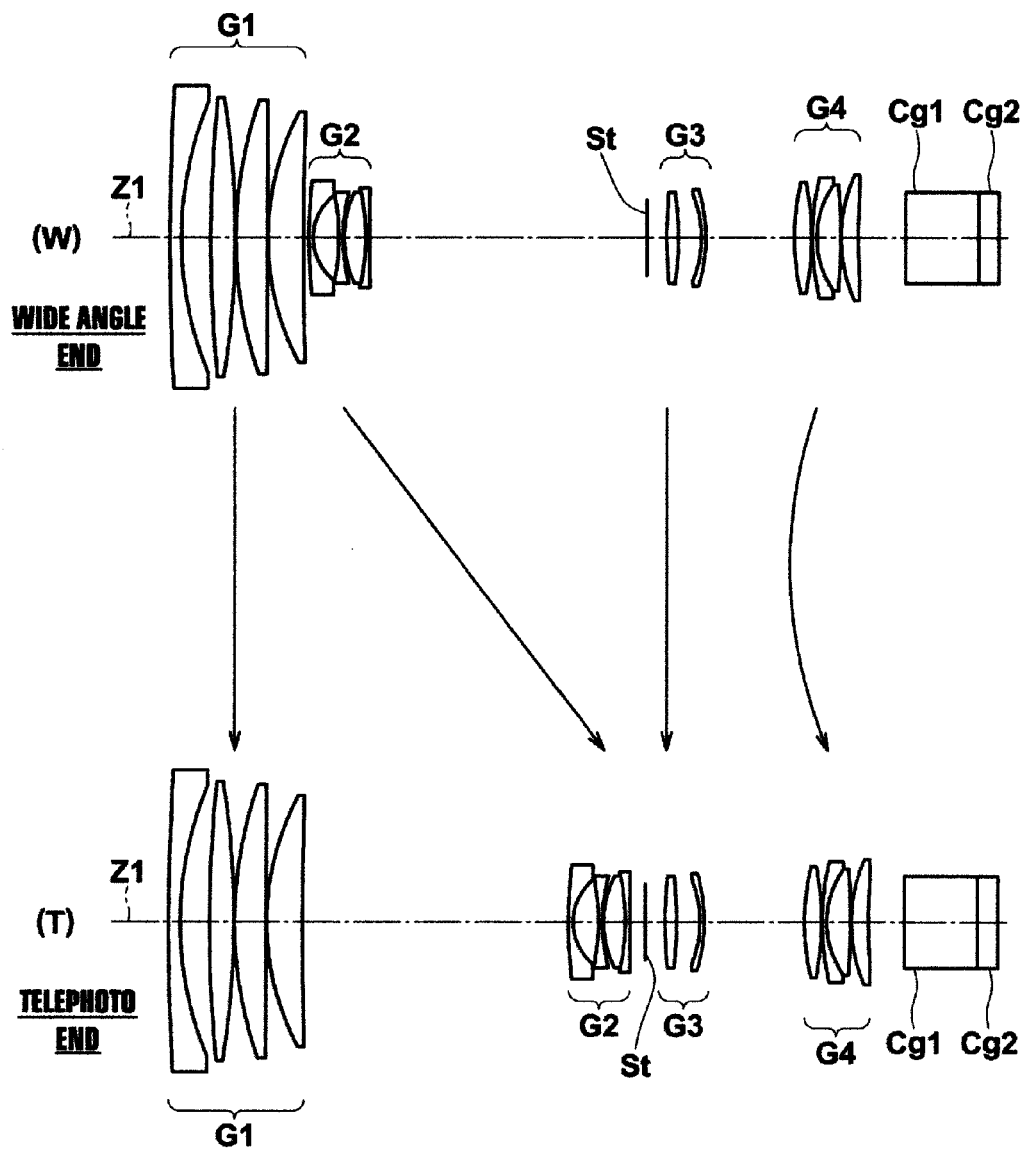
FIG. 2B is a diagram illustrating, in comparison, the state of the zoom lens at wide angle end and the state of the zoom lens at telephoto end in Example 1.
Figure 3B:
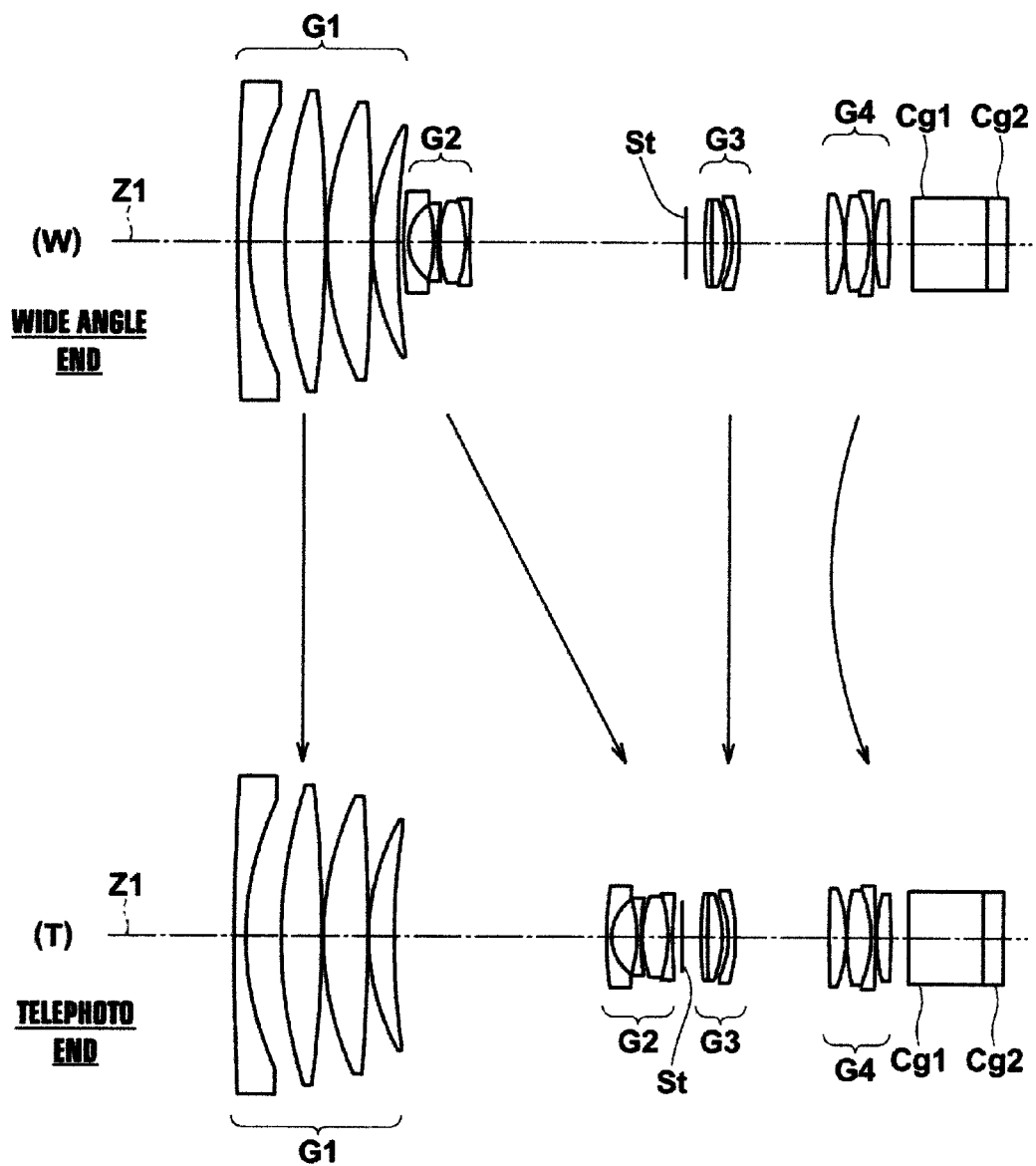
FIG. 3B is a diagram illustrating, in comparison, the state of the zoom lens at wide angle end and the state of the zoom lens at telephoto end in Example 2.
Figure 4B:
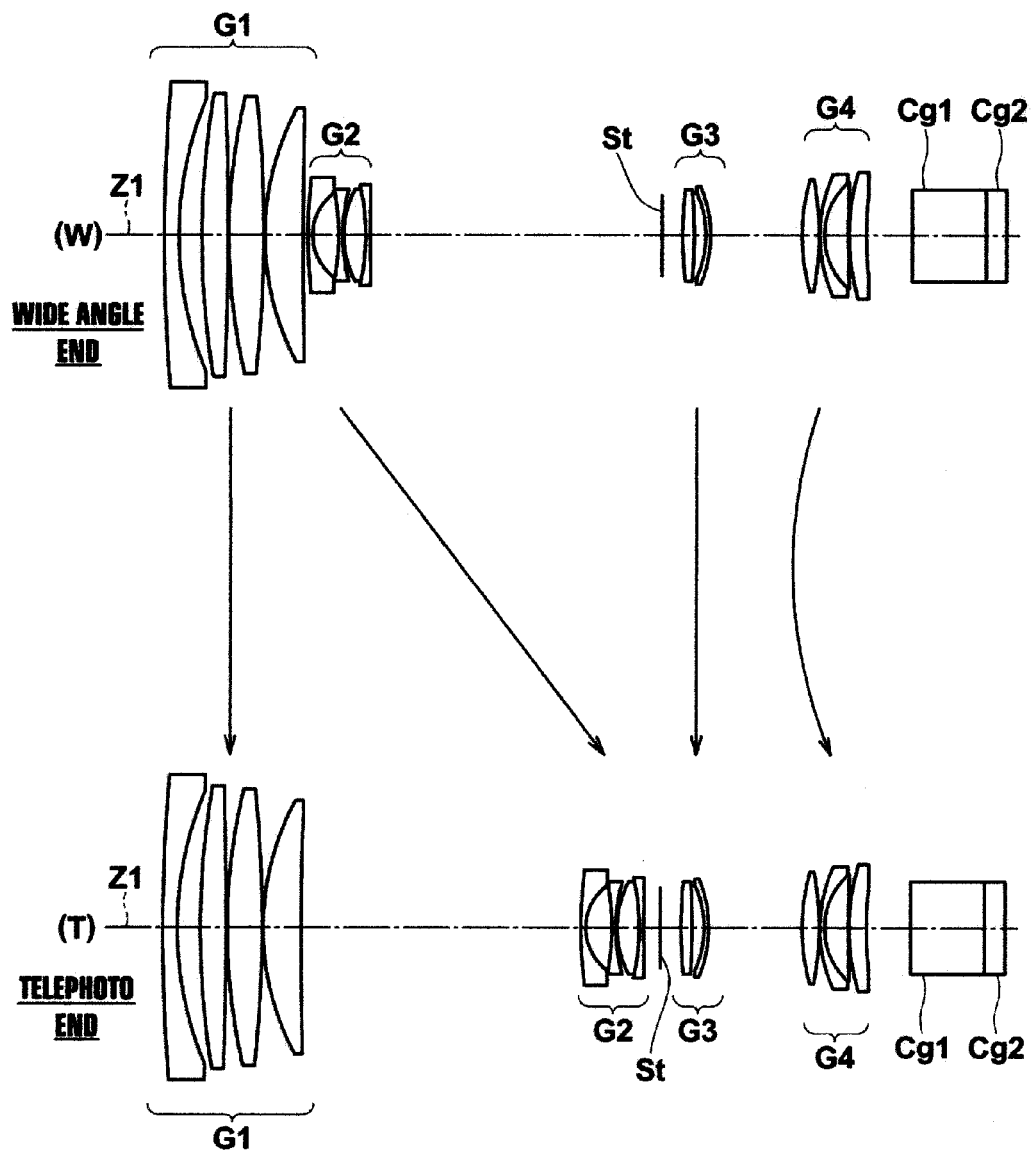
FIG. 4B is a diagram illustrating, in comparison, the state of the zoom lens at wide angle end and the state of the zoom lens at telephoto end in Example 3.
Figure 5B:
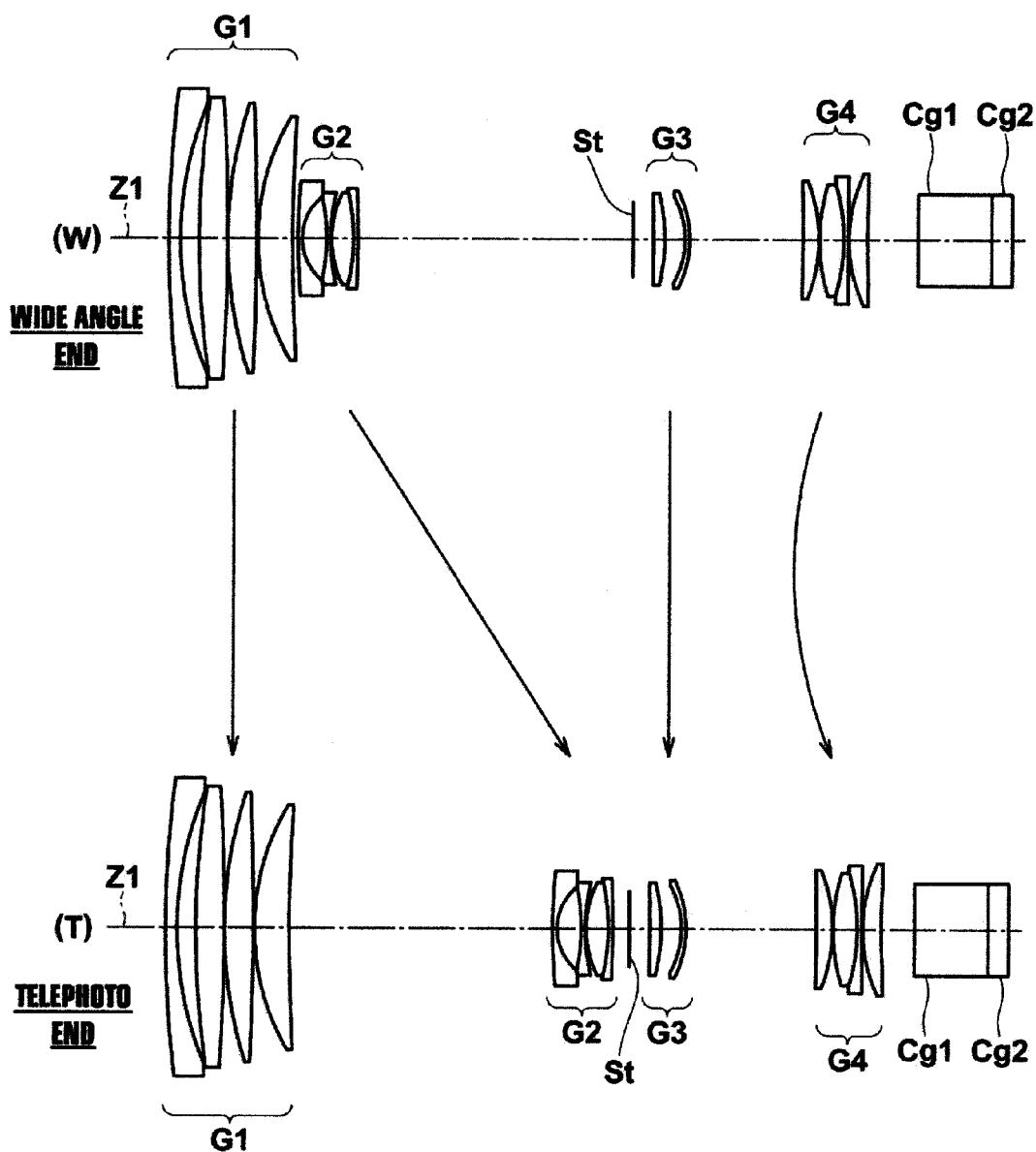
FIG. 5B is a diagram illustrating, in comparison, the state of the zoom lens at wide angle end and the state of the zoom lens at telephoto end in Example 4.
Figure 6B:
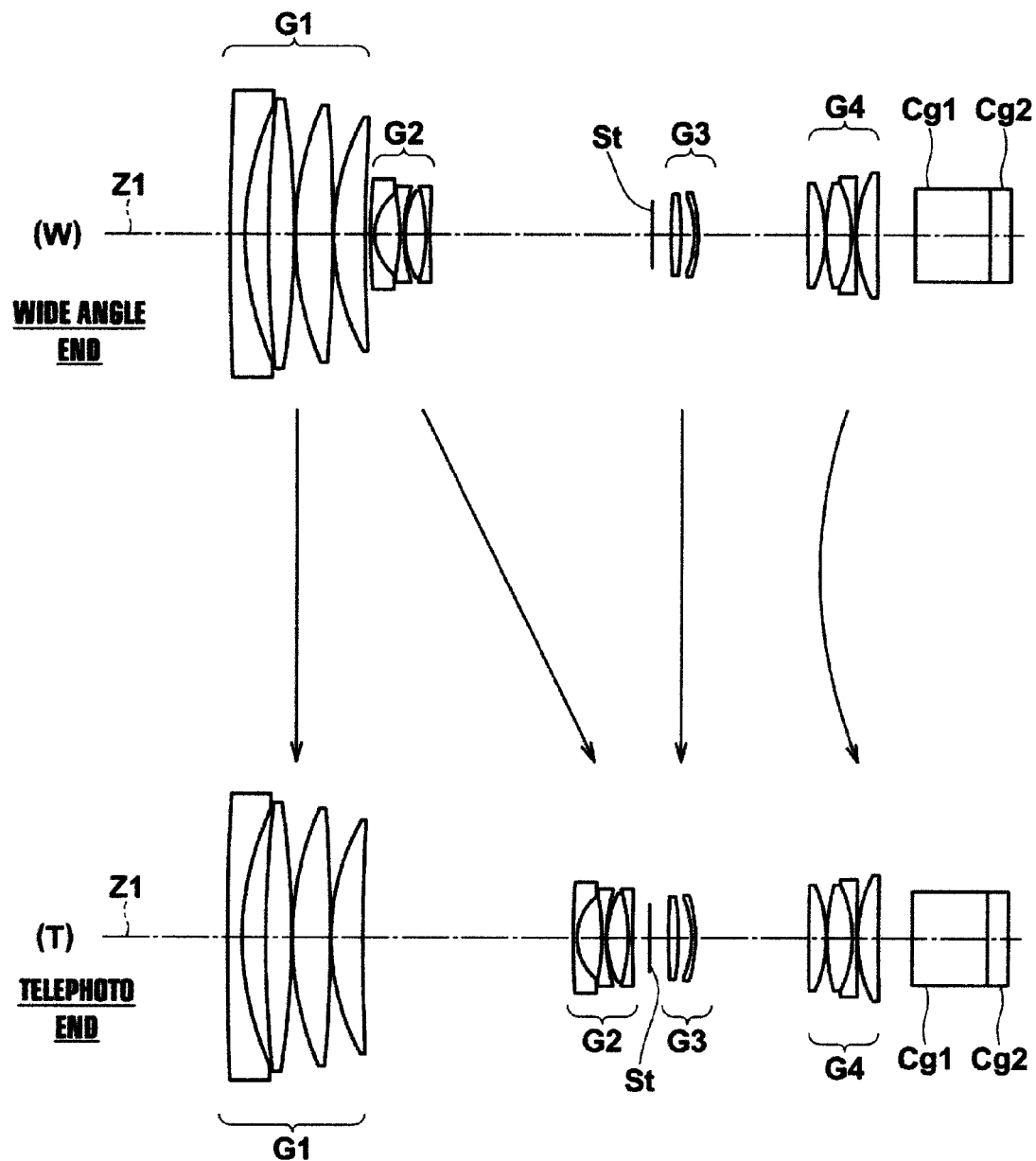
FIG. 6B is a diagram illustrating, in comparison, the state of the zoom lens at wide angle end and the state of the zoom lens at telephoto end in Example 5.
Figure 9A:
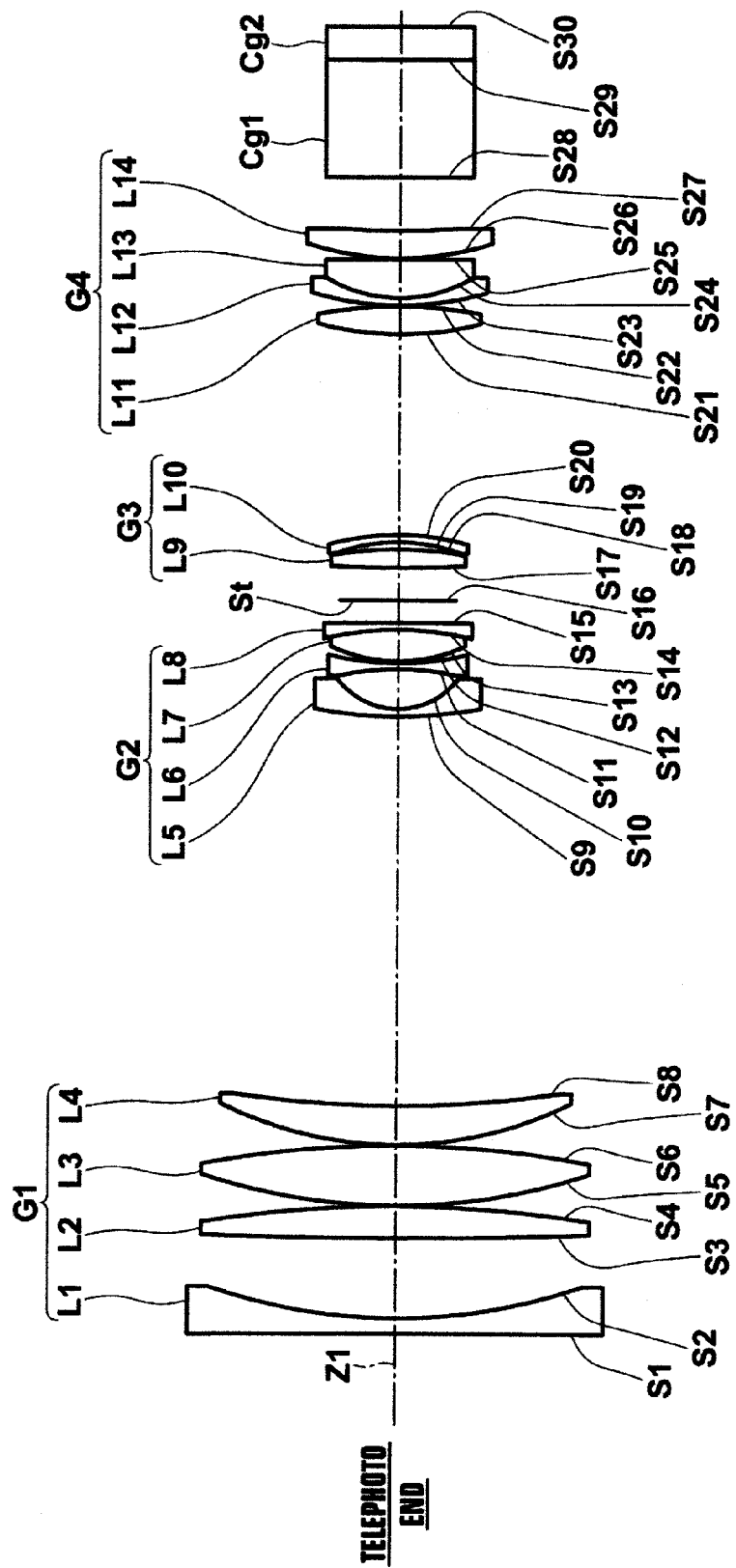
FIG. 9A is a schematic cross section illustrating the structure of a zoom lens in Example 8.
Figure 9B:
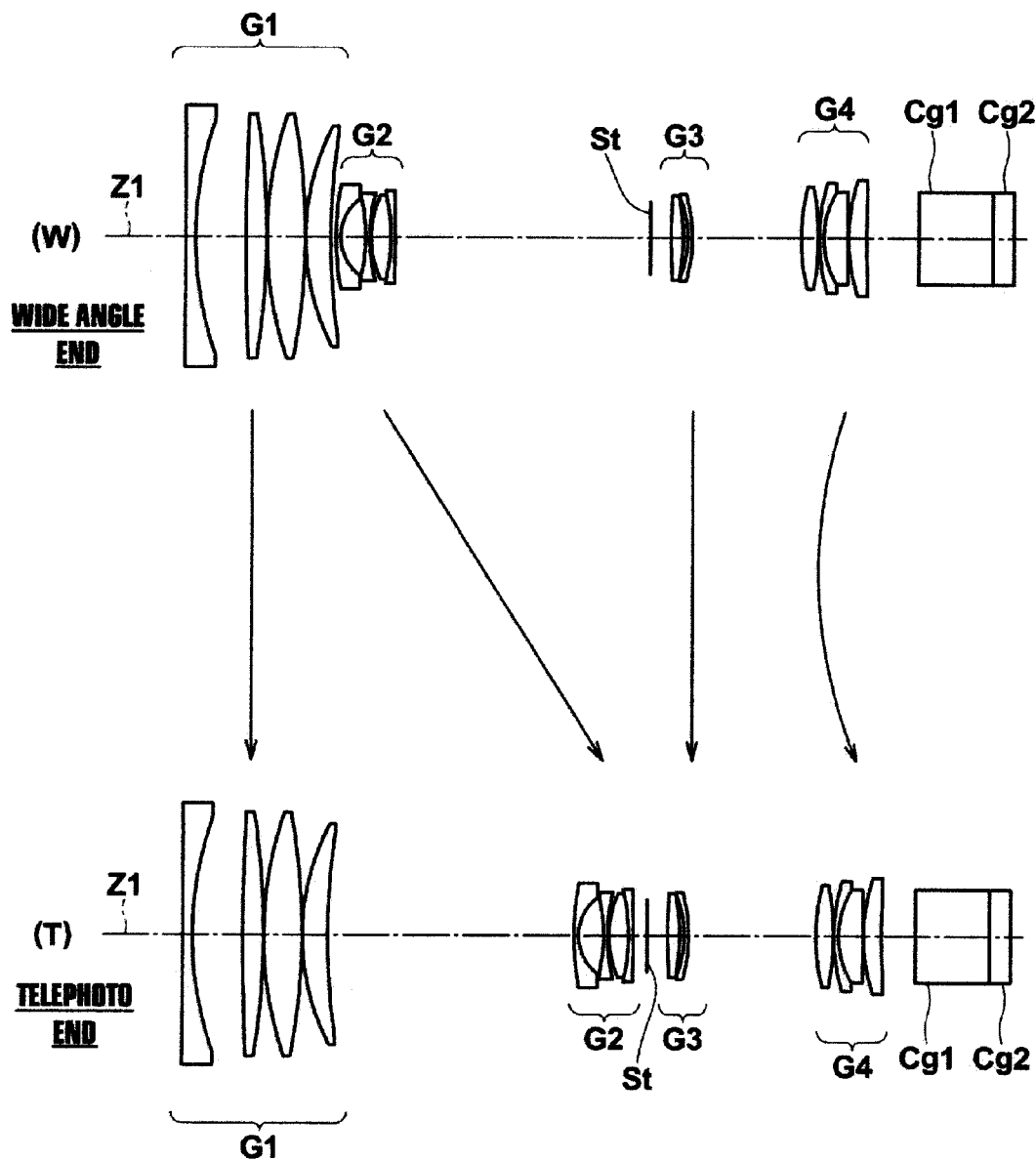
FIG. 9B is a diagram illustrating, in comparison, the state of the zoom lens at wide angle end and the state of the zoom lens at telephoto end in Example 8.
Figure 10A:
FIGS. 10A, 10B, 10C and 10D are diagrams illustrating various aberrations (spherical aberration, astigmatism, distortion, and lateral chromatic aberration, respectively) of the zoom lens in Example 1 at wide angle end.
Figure 10B:
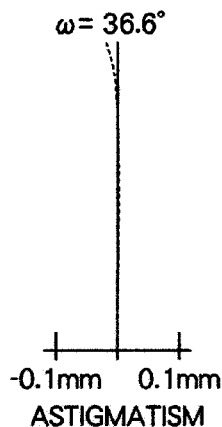
Figure 10C:
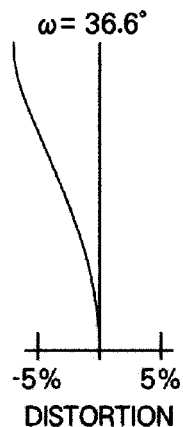
Figure 10D:
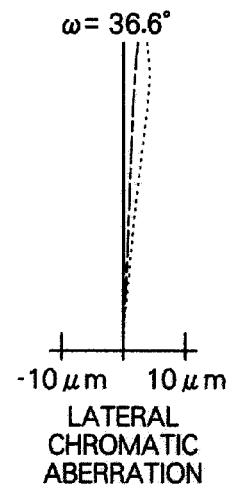
Figure 10E:
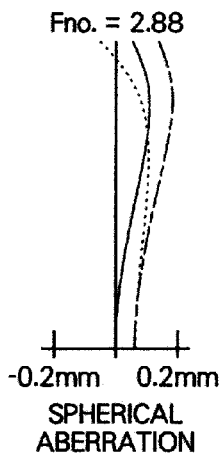
FIGS. 10E, 10F, 10G and 10H are diagrams illustrating various aberrations (spherical aberration, astigmatism, distortion, and lateral chromatic aberration, respectively) of the zoom lens in Example 1 at telephoto end.
Figure 10F:
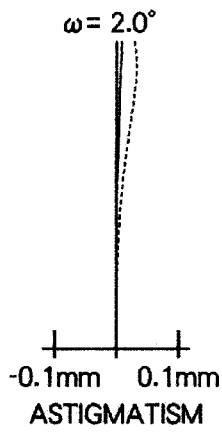
Figure 10G:
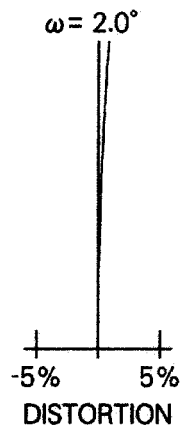
Figure 10H:
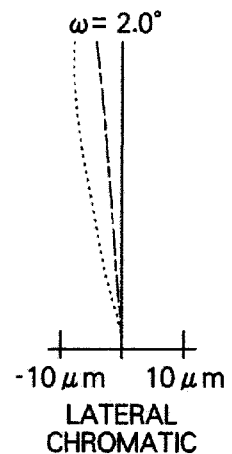
Figure 11A:
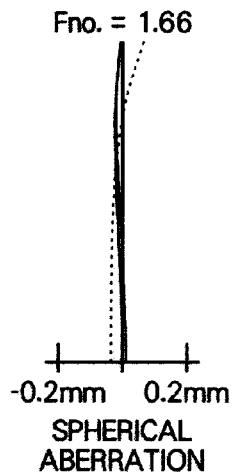
FIGS. 11A, 11B, 11C and 11D are diagrams illustrating various aberrations (spherical aberration, astigmatism, distortion, and lateral chromatic aberration, respectively) of the zoom lens in Example 2 at wide angle end.
Figure 11B:
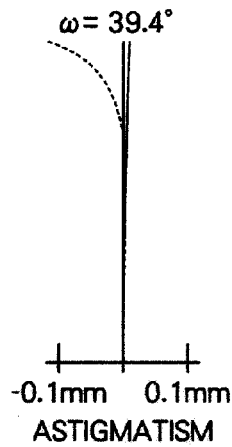
Figure 11C:
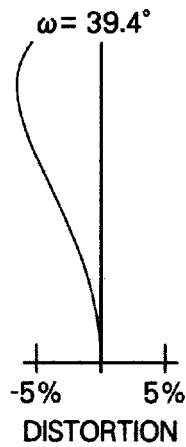
Figure 11D:
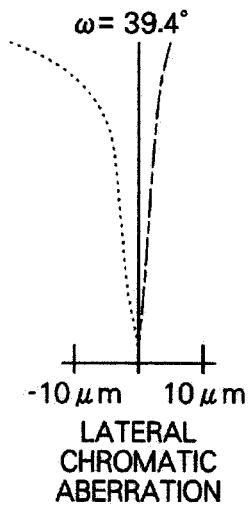
Figure 11E:
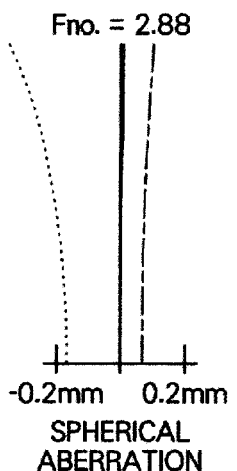
FIGS. 11E, 11F, 11G and 11H are diagrams illustrating various aberrations (spherical aberration, astigmatism, distortion, and lateral chromatic aberration, respectively) of the zoom lens in Example 2 at telephoto end.
Figure 11F:
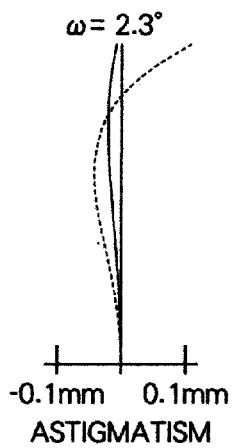
Figure 11G:
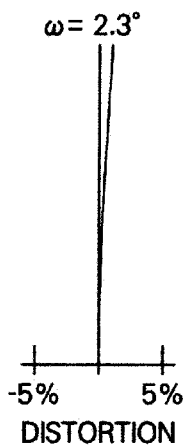
Figure 11H:
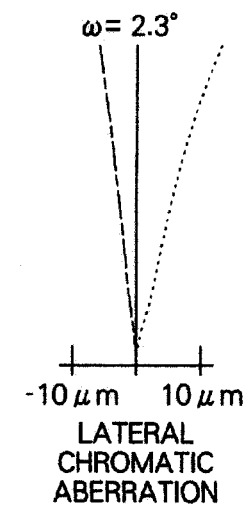
Figure 12A:
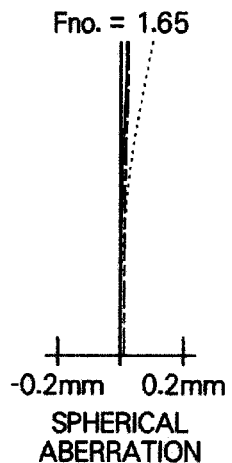
FIGS. 12A, 12B, 12C and 12D are diagrams illustrating various aberrations (spherical aberration, astigmatism, distortion, and lateral chromatic aberration, respectively) of the zoom lens in Example 3 at wide angle end.
Figure 12B:
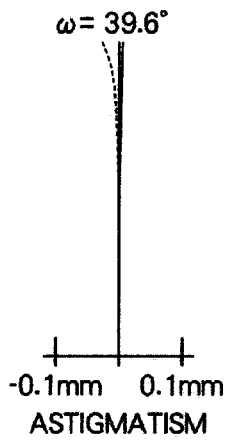
Figure 12C:
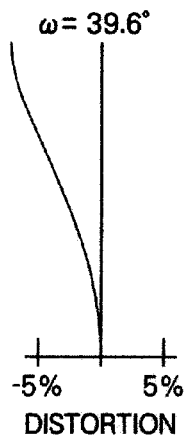
Figure 12D:
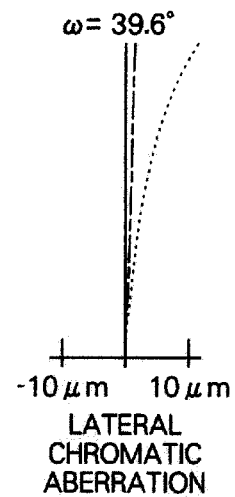
Figure 12E:
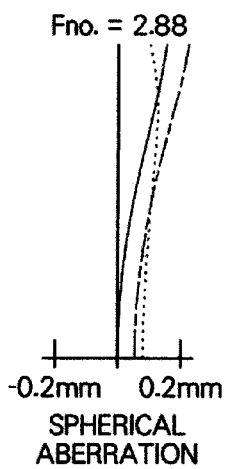
FIGS. 12E, 12F, 12G and 12H are diagrams illustrating various aberrations (spherical aberration, astigmatism, distortion, and lateral chromatic aberration, respectively) of the zoom lens in Example 3 at telephoto end.
Figure 12F:
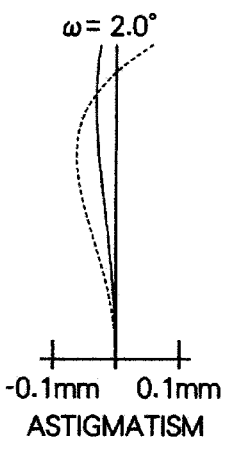
Figure 12G:
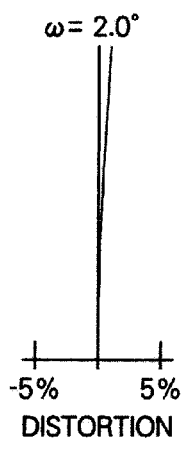
Figure 12H:
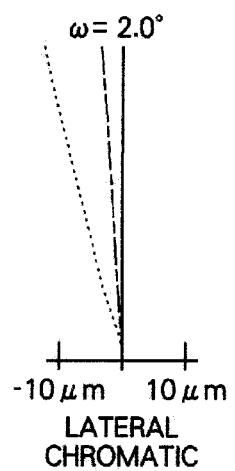
Figure 13A:
FIGS. 13A, 13B, 13C and 13D are diagrams illustrating various aberrations (spherical aberration, astigmatism, distortion, and lateral chromatic aberration, respectively) of the zoom lens in Example 4 at wide angle end.
Figure 13B:
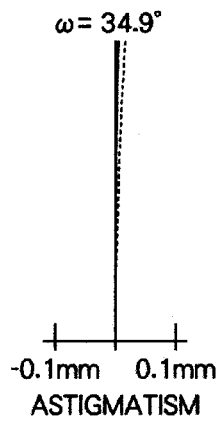
Figure 13C:
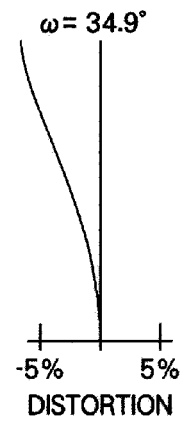
Figure 13D:
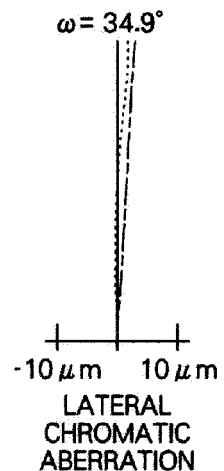
Figure 13E:
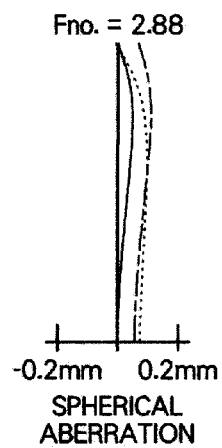
FIGS. 13E, 13F, 13G and 13H are diagrams illustrating various aberrations (spherical aberration, astigmatism, distortion, and lateral chromatic aberration, respectively) of the zoom lens in Example 4 at telephoto end.
Figure 13F:
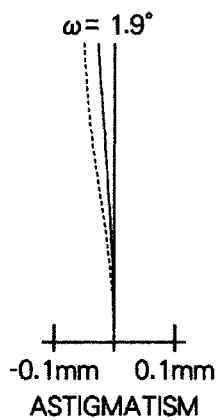
Figure 13G:
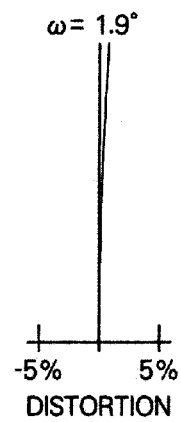
Figure 13H:
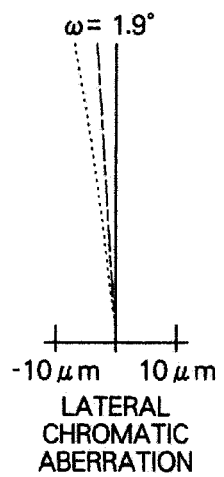
Figure 14A:
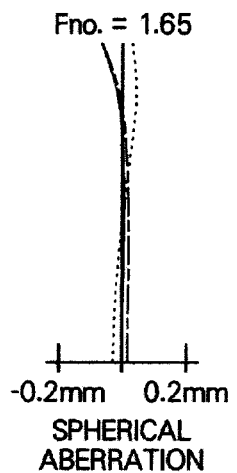
FIGS. 14A, 14B, 14C and 14D are diagrams illustrating various aberrations (spherical aberration, astigmatism, distortion, and lateral chromatic aberration, respectively) of the zoom lens in Example 5 at wide angle end.
Figure 14B:
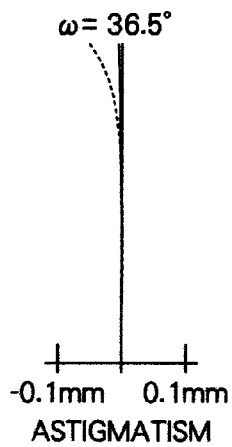
Figure 14C:
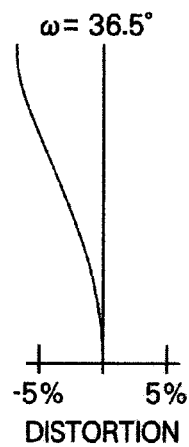
Figure 14D:
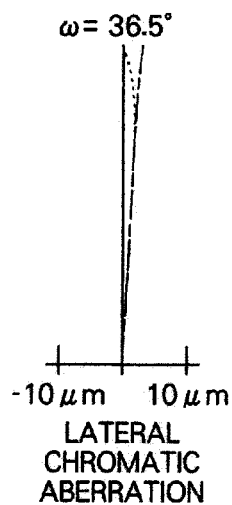
Figure 14E:
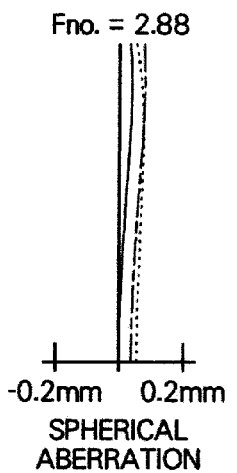
FIGS. 14E, 14F, 14G and 14H are diagrams illustrating various aberrations (spherical aberration, astigmatism, distortion, and lateral chromatic aberration, respectively) of the zoom lens in Example 5 at telephoto end.
Figure 14F:
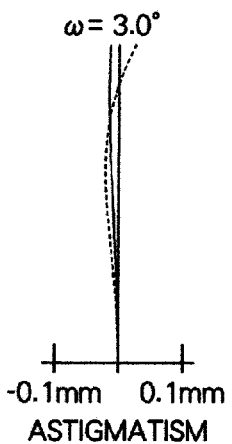
Figure 14G:
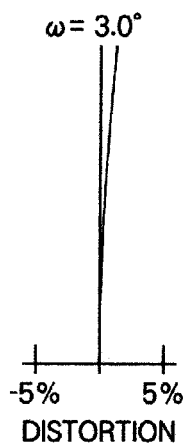
Figure 14H:
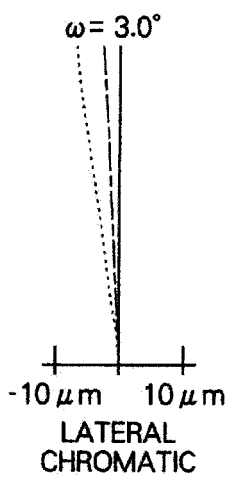
Figure 15A:
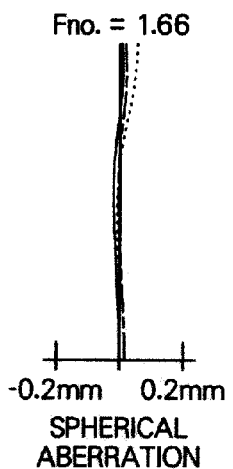
FIGS. 15A, 15B, 15C and 15D are diagrams illustrating various aberrations (spherical aberration, astigmatism, distortion, and lateral chromatic aberration, respectively) of the zoom lens in Example 6 at wide angle end.
Figure 15B:
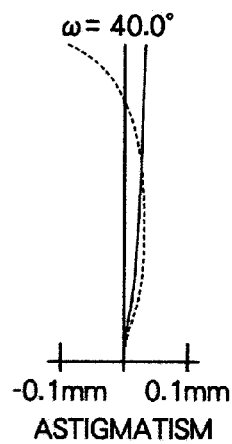
Figure 15C:
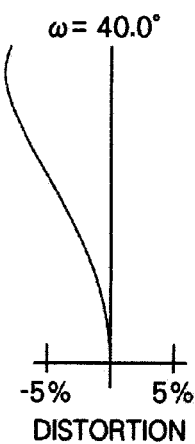
Figure 15D:
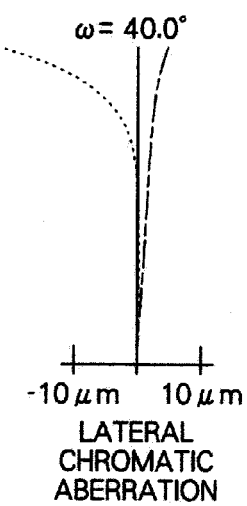
Figure 15E:
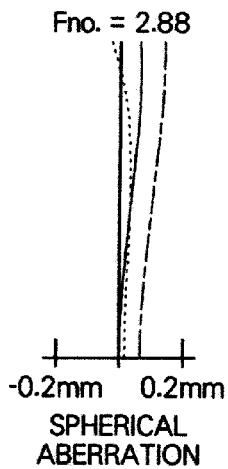
FIGS. 15E, 15F, 15G and 15H are diagrams illustrating various aberrations (spherical aberration, astigmatism, distortion, and lateral chromatic aberration, respectively) of the zoom lens in Example 6 at telephoto end.
Figure 15F:
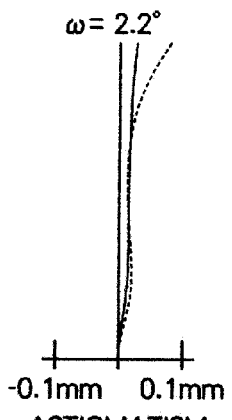
Figure 15G:
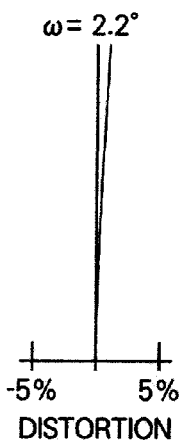
Figure 15H:
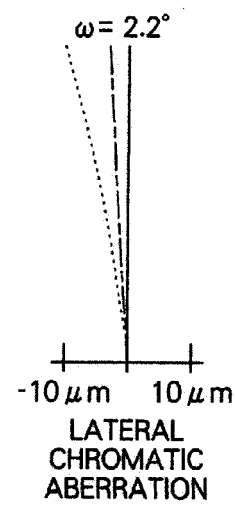
Figure 17A:
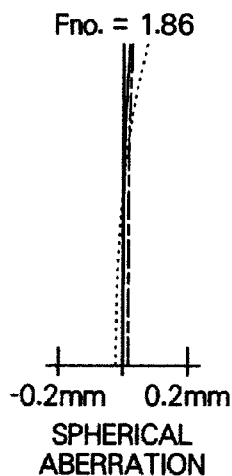
FIGS. 17A, 17B, 17C and 17D are diagrams illustrating various aberrations (spherical aberration, astigmatism, distortion, and lateral chromatic aberration, respectively) of the zoom lens in Example 8 at wide angle end.
Figure 17B:
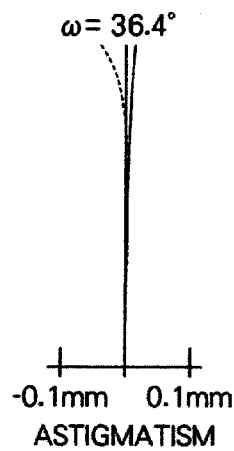
Figure 17C:
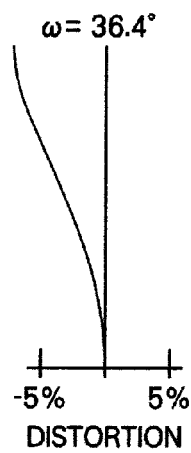
Figure 17D:
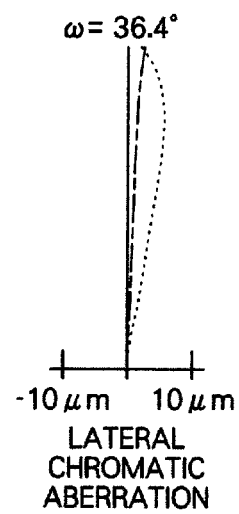
Figure 17E:
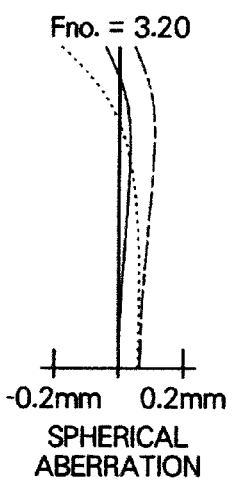
FIGS. 17E, 17F, 17G and 17H are diagrams illustrating various aberrations (spherical aberration, astigmatism, distortion, and lateral chromatic aberration, respectively) of the zoom lens in Example 8 at telephoto end.
Figure 17F:
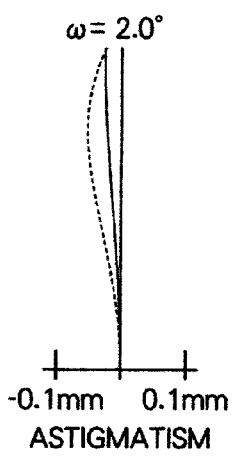
Figure 17G:
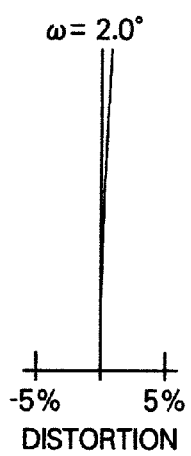
Figure 17H:
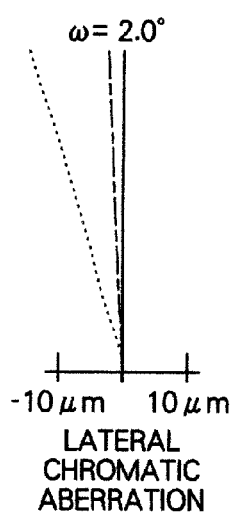

FIGS. 1A and 1B are schematic cross sections illustrating the structure of an imaging apparatus including a zoom lens of the present invention. FIG. 1A is a diagram illustrating the state of the imaging apparatus in detail when zoom setting (also called as a zoom position) is at wide angle end. FIG. 1B is a diagram illustrating, in comparison, the state of the imaging apparatus when zoom setting is at wide angle end and at telephoto end. The upper section (W) of FIG. 1B illustrates the state when zoom setting is at wide angle end, and the lower section (T) of FIG. 1B illustrates the state when zoom setting is at telephoto end.

An imaging apparatus 200 illustrated in FIG. 1B is a hand-held-type motion picture imaging apparatus for business operations or professional use, which needs to have small size and light weight.

A zoom lens 100 mounted on the imaging apparatus 200 forms optical image Hk representing subject H on a light receiving plane 210J of an imaging device 210, such as a CCD and a CMOS. The zoom lens 100 can achieve a wide angle and high variable magnification at the same time without increasing the lens diameter of the zoom lens and the number of lenses constituting the zoom lens, while suppressing aberrations.

The imaging device 210 arranged in the imaging apparatus 200 converts the optical image Hk representing the subject H, which is formed through the zoom lens 100, into electrical signals Pk. Further, the imaging device 210 outputs the electrical signals Pk representing the optical image Hk.

In the following descriptions, a lens having positive refractive power is also referred to as a positive lens, and a lens having negative refractive power is also referred to as a negative lens. Further, a lens group having positive refractive power is also referred to as a positive lens group, and a lens group having negative refractive power is also referred to as a negative lens group.

<Basic Structure of Zoom Lens, and Actions and Effects Thereof>

First, the basic structure of a zoom lens will be described. The zoom lens 100 includes positive first lens group G1, which is fixed during zooming (while magnification is changed), negative second lens group G2, which is moved during zooming, positive third lens group G3, which is fixed during zooming, positive fourth lens group G4, which is moved during zooming in such a manner that a fluctuation of an image formation position caused by zooming is corrected so that optical image Hk formed through the zoom lens 100 is focused on the light receiving plane 210J, and optical members Cg1, Cg2, which are a color separation optical system, various filters or the like. The first lens group G1, the second lens group G2, the third lens group G3, the fourth lens group G4 and the optical members Cg1, Cg2 are arranged, along optical axis Z1, in this order from the object side of the zoom lens.

The first lens group G1 consists of negative first-group first lens L1, positive first-group second lens L2, positive first-group third lens L3, and positive first-group fourth lens L4, which are arranged in this order from the object side. The first lens group G1 consists of only four lenses.

When a cemented lens formed by cementing n-number of lenses together is used, the number of the cemented lens is counted as n-number.

The first-group first lens L1 and the first-group second lens L2 are apart from each other, and a gap (air space) is formed between the two lenses. In other words, the first-group first lens L1 and the first-group second lens L2 are arranged in such a manner that an air space is formed therebetween.

Further, the first-group first lens L1 satisfies the following formula (1):

$$-2.0 < (R11r+R11f)/(R11r-R11f) < -0.4 \quad (1),$$

where

R11f is a radius of curvature of an object-side surface of the first-group first lens L1, and R11r is a radius of curvature of an image-side surface of the first-group first lens L1.

The formula (1) defines the relationship between the radii of curvature of the two surfaces of the first-group first lens L1.

If the zoom lens is structured in such a manner that a space is provided between the first-group first lens L1 and the first-group second lens L2, and that the formula (1) is satisfied, it is possible to achieve a wide angle, while correcting distortion and curvature of field in an excellent manner when zoom setting is in the vicinity of wide angle end.

However, if the zoom lens is structured in such a manner that the value of (R11r+R11f)/(R11r−R11f) is lower than the lower limit defined by the formula (1), correction of spherical aberrations becomes difficult when zoom setting is at telephoto end.

In contrast, when the zoom lens is structured in such a manner that the value of (R11r+R11f)/(R11r−R11f) exceeds the upper limit defined by the formula (1), correction of distortion becomes difficult when zoom setting is at wide angle end.

In the zoom lens 100 of the present invention, it is desirable that the diameter of the aperture stop is regulated in such a manner to be narrowed from middle magnification range through telephoto end. It is assumed that the diameter of the aperture stop is controlled to approximately F2.9 at telephoto end.

<Composition Further Limiting Basic Structure of Zoom Lens, and Actions and Effects Thereof>

Next, composition further limiting the basic structure of the zoom lens 100 and the imaging apparatus 200, and the actions and effects thereof will be described. The composition further limiting the basic structure is not essential to the zoom lens 100 of the present invention and the imaging apparatus 200 of the present invention.

The zoom lens 100 of the present invention and the imaging apparatus 200 of the present invention may satisfy only one of the composition elements that further limit the basic structure. Alternatively, at least two of the composition elements in combination may be satisfied.

Further, the meanings of parameters used in formulas (2) through (7) are as follows:

R11f: a radius of curvature of an object-side surface of the first-group first lens;

R11r: a radius of curvature of an image-side surface of the first-group first lens;

f1: the focal length of the first lens group;

f11: the focal length of the first-group first lens;

vd1p: the Abbe number of at least one of the positive lenses in the first lens group with respect to d-line;

fw: the focal length of the entire system of the zoom lens at wide angle end;

f2: the focal length of the second lens group;

ft: the focal length of the entire system of the zoom lens at telephoto end;

D2: an air space between the first-group first lens and the first-group second lens (a distance on optical axis Z1);

TL1: the thickness of the first lens group (a thickness on optical axis Z1);

f3: the focal length of the third lens group; and f4: the focal length of the fourth lens group.

Further, Abbe number ν of an optical member with respect to d-line is a value obtained by the following equation:

$$\nu = (Nd-1)/(NF-NC),$$

where

NF: the refractive index of the optical member with respect to F-line (486.1 nm), Nd: the refractive index of the optical member with respect to d-line (587.6 nm), and NC: the refractive index of the optical member with respect to C-line (656.3 nm).

<Limiting Composition Corresponding to Formula (1)>

It is more desirable that the first-group first lens L1 satisfies the following formula (1') instead of the formula (1):

$$-1.9 < (R11r+R11f)/(R11r-R11f) < -0.4 \quad (1').$$

When the zoom lens is structured in such a manner to satisfy the formula (1'), it is possible to achieve more favorable effects, compared with the case of satisfying the formula (1).

<Limiting Composition Corresponding to Formula (2)>

The following formula (2) limits the structure of the zoom lens:

$$-2.0 < f11/f1 < -1.2 \quad (2).$$

Further, the following formula (2') limits the structure of the zoom lens in a more desirable manner than the formula (2):

$$-1.9 < f11/f1 < -1.3 \quad (2').$$

The formulas (2) and (2') define the relationship between focal length f11 of first-group first lens L1 and focal length f1 of the whole first lens group G1. In other words, the formulas (2) and (2') regulate the power of the first-group first lens L1 with respect to the power of the whole first lens group G1.

When the zoom lens 100 is structured in such a manner that the value of f11/f1 is lower than the lower limit defined by the formula (2), the power of the first-group first lens L1 becomes strong, and it becomes difficult to balance the curvature of field and distortion at wide angle end and spherical aberrations at telephoto end. Further, there is a problem that the power of the whole first lens group G1 becomes weak, and the size of the lens system becomes large.

In contrast, when the zoom lens 100 is structured in such a manner that the value of f11/f1 exceeds the upper limit defined by the formula (2), it becomes difficult to increase the angle of view. If a desirable angle of view is tried to be achieved while distributing power in such a manner, the outer diameter of the lens becomes inevitably large.

If the zoom lens 100 is structured in such a manner to satisfy the formula (2) or (2'), it is possible to structure the zoom lens 100 without inducing the problems as described above. If the zoom lens 100 is structured in such a manner to satisfy the formula (2'), it is possible to obtain more desirable lens performance, compared with the case of satisfying the formula (2).

<Limiting Composition Corresponding to Formula (3)>

The following formula (3) limits the structure of the zoom lens:

$$65 < vd1p \quad (3).$$

Further, the following formula (3') limits the structure of the zoom lens in a more desirable manner than the formula (3):

$$67 < vd1p \quad (3').$$

The formulas (3) and (3') define the dispersion characteristic of an optical member used as positive lenses in the first lens group G1.

When the zoom lens 100 is structured in such a manner that the value of vd1p is lower than the lower limit defined by the formula (3), longitudinal chromatic aberrations increase when zoom setting is in the vicinity of telephoto end.

If the zoom lens 100 is structured in such a manner to satisfy the formula (3) or (3'), it is possible to structure the zoom lens 100 without inducing the problems as described above. If the zoom lens 100 is structured in such a manner to satisfy the formula (3'), it is possible to obtain more desirable lens performance, compared with the case of satisfying the formula (3).

<Limiting Composition Corresponding to Formula (4)>

The following formula (4) limits the structure of the zoom lens:

$$-2.9 < f2/fw < -1.8 \quad (4).$$

Further, the following formula (4') limits the structure of the zoom lens in a more desirable manner than the formula (4):

$$-2.8 < f2/fw < -1.9 \quad (4').$$

The formulas (4) and (4') define the ratio of focal length f2 of second lens group G2 with respect to focal length fw of the entire system of the zoom lens when zoom setting is at wide angle end.

When the zoom lens 100 is structured in such a manner that the value of f2/fw is lower than the lower limit defined by the formula (4), the power of the second lens group G2 becomes too strong, and it becomes difficult to correct curvature of field and coma aberrations. Further, a fluctuation of aberrations caused by zooming becomes large. Further, there is a problem that an allowable error in manufacture of products becomes small.

In contrast, when the zoom lens 100 is structured in such a manner that the value of f2/fw exceeds the upper limit defined by the formula (4), the movement amount of the second lens group G2 increases, and there is a problem that the size of the apparatus becomes large.

If the zoom lens 100 is structured in such a manner to satisfy the formula (4) or (4'), it is possible to structure the zoom lens 100 without inducing the problems as described above. If the zoom lens 100 is structured in such a manner to satisfy the formula (4'), it is possible to obtain more desirable lens performance, compared with the case of satisfying the formula (4).

Further, the expression "an allowable error in manufacture of products becomes small" means that performance deterioration becomes sensitive to an error in manufacture, namely an error in processing, an error in assembly or the like (in other words, sensitivity or performance deterioration sensitivity to the error is high). If the allowable error in manufacture is small, the performance of the zoom lens is sensitive to an error in processing and an error in assembly, and a deterioration in performance is prominent when such an error occurs. In contrast, if the allowable error in manufacture is large, in other words, if the performance deterioration sensitivity is small, the zoom lens is less sensitive or insensitive to an error in processing and an error in assembly, and the degree of deterioration in performance is small even when such an error occurs.

<Limiting Composition Corresponding to Formula (5)>

The following formula (5) limits the structure of the zoom lens:

$$0.55 < f1/ft < 0.88 \quad (5).$$

Further, the following formula (5') limits the structure of the zoom lens in a more desirable manner than the formula (5):

$$0.58 < f1/ft < 0.85 \quad (5').$$

The formulas (5) and (5') define the ratio of focal length f1 of first lens group G1 with respect to focal length ft of the entire system of the zoom lens when zoom setting is at telephoto end.

When the zoom lens is structured in such a manner that the value of f1/ft is lower than the lower limit defined by the formula (5), the structure is advantageous to reduce the size of the zoom lens. However, the role of the first lens group G1 increases, and correction of aberrations becomes difficult. Especially, it becomes difficult to correct spherical aberrations and chromatic aberrations when zoom setting is in the vicinity of telephoto end. Further, there is a problem that an allowable error in manufacture of the first lens group G1 becomes small.

In contrast, when the zoom lens is structured in such a manner that the value of f1/ft exceeds the upper limit defined by the formula (5), the entire system of the zoom lens becomes long.

If the zoom lens 100 is structured in such a manner to satisfy the formula (5) or (5'), it is possible to structure the zoom lens 100 without inducing the problems as described above. If the zoom lens 100 is structured in such a manner to satisfy the formula (5'), it is possible to obtain more desirable lens performance, compared with the case of satisfying the formula (5).

<Composition Limiting Second Lens Group>

The second lens group G2 may be composed of three negative lenses and a positive lens. If the second lens group G2 includes three negative lenses, it is possible to make the position of an object-side principal point of the second lens group G2 closer to the object side of the zoom lens, thereby reducing a distance between a principal point of the first lens group G1 and the principal point of the second lens group G2. Further, it is possible to maintain the height at which off-axial rays pass through the first lens group G1 at a low level. Therefore, it is possible to prevent the size of lenses constituting the first lens group G1 from becoming large.

<Composition Limiting Second Lens Group>

The second lens group G2 may be composed of second-group first lens L5 having negative refractive power, second-group second lens L6 having negative refractive power, second-group third lens L7 having positive refractive power, and second-group fourth lens L8 having negative refractive power, which are arranged in this order from the object side.

When the second lens group G2 is structured in such a manner, it is possible to concentrate the negative refractive power in an object-side part of the second lens group G2, and to maintain the height at which off-axial rays pass through the first lens group G1 at an even lower level. Therefore, it is possible to make the diameter of the first lens group G1 small.

<Limiting Composition Corresponding to Formula (6)>

The following formula (6) limits the structure of the zoom lens:

$$0.1 < D2/TL1 < 0.4 \quad (6).$$

Further, the following formula (6') limits the structure of the zoom lens in a more desirable manner than the formula (6):

$$0.13 < D2/TL1 < 0.38 \quad (6').$$

Further, the following formula (6") limits the structure of the zoom lens in an even more desirable manner:

$$0.13 < D2/TL1 < 0.18 \quad (6'')$$

The formulas (6), (6') and (6") define the ratio of air space D2 between first-group first lens L1 and first-group second lens L2 with respect to total thickness TL1 of first lens group G1.

When the zoom lens is structured in such a manner that the value of D2/TL1 is lower than the lower limit defined by the formula (6), a distance between a principal point of the first lens group G1 and a principal point of the second lens group G2 increases. Therefore, there is a problem that the effective diameter of at least a lens constituting the first lens group G1 increases.

In contrast, when the zoom lens is structured in such a manner that the value of D2/TL1 exceeds the upper limit defined by the formula (6), the length of the entire system of the zoom lens becomes too long.

If the zoom lens 100 is structured in such a manner to satisfy the formula (6) or (6') or (6"), it is possible to structure the zoom lens 100 without inducing the problems as described above. If the zoom lens 100 is structured in such a manner to satisfy the formula (6'), it is possible to obtain more desirable lens performance, compared with the case of satisfying the formula (6). Further, if the zoom lens 100 is structured in such a manner to satisfy the formula (6"), it is possible to obtain even more desirable lens performance, compared with the case of satisfying the formula (6').

<Limiting Composition Corresponding to Formula (7)>

The following formula (7) limits the structure of the zoom lens:

$$2.5 < f3/f4 < 6.0 \quad (7).$$

Further, the following formula (7') limits the structure of the zoom lens in a more desirable manner than the formula (7):

$$2.6 < f3/f4 < 5.9 \quad (7').$$

The formulas (7) and (7') define the ratio of focal length f3 of third lens group G3 with respect to focal length f4 of the whole fourth lens group G4.

When the zoom lens is structured in such a manner that the value of f3/f4 is lower than the lower limit defined by the formula (7), it becomes difficult to maintain sufficient back focus for inserting a color separation optical system, various filters or the like.

In contrast, when the zoom lens is structured in such a manner that the value of f3/f4 exceeds the upper limit defined by the formula (7), the length of the entire system of the zoom lens becomes too long. Further, there is a problem that correction of spherical aberrations and coma aberrations becomes difficult when zoom setting is in the vicinity of wide angle end.

When the zoom lens is structured in such a manner to satisfy the formula (7) or (7'), it is possible to prevent the size of the zoom lens from becoming large, while maintaining long back focus that is sufficient for inserting a color separation optical system, various filters or the like. Such long back focus is necessary to cope with a three panel method adopted in high-image-quality video cameras, cameras for broadcasting, or the like. When the zoom lens is structured in such a manner that the value of f3/f4 satisfies the formula (7'), it is possible to obtain more desirable lens performance, compared with the case of satisfying the formula (7).

<Composition Limiting Fourth Lens Group>

Fourth lens group G4 may be composed of three lenses having positive refractive power and a lens having negative refractive power.

When the variable magnification of a zoom lens is increased, it is desirable that the fourth lens group G4 is composed of four lenses to suppress a fluctuation in aberrations during zooming and a fluctuation in aberrations by focusing when zoom setting is in the vicinity of telephoto end. For example, when the fourth lens group G4 is composed of three positive lenses and a negative lens, it is not necessary to arrange any aspheric lens in the fourth lens group G4. Hence, it is possible to reduce the cost of the zoom lens, and to increase an allowable error in manufacture.

<Composition Limiting Third Lens Group>

The third lens group may include shift lens group G3s that is moved in a direction perpendicular to the optical axis (a direction perpendicular to optical axis Z1) to shift, in the direction perpendicular to the optical axis, an optical image formed through the zoom lens and fixed lens group G3k that is fixed with respect to the direction perpendicular to the optical axis. The shift lens group G3s may have positive refractive power as a whole, and be composed of two lenses of a positive lens and a negative lens. Further, the fixed lens group G3k may have negative refractive power as a whole. The fixed lens group G3k may be arranged either on the object side of the shift lens group G3s or on the image side of the shift lens group G3s.

Here, it is desirable that the shift lens group G3s is composed of at least one positive lens and a negative lens to suppress chromatic aberrations caused by eccentricity of a lens to a lower level when the shift lens group G3s is moved to shift optical image Hk in the direction perpendicular to the optical axis.

When the shift lens group G3s, which is moved in the direction perpendicular to the optical axis to prevent hand-shake blurs during photography, is composed of a small number of lenses, it is possible to further reduce the weight of the shift lens group G3s. Therefore, it is possible to reduce a load on an anti-vibration drive system for preventing hand-shake blurs.

Further, it is necessary that the shift lens group G3s has sufficiently strong power to prevent the shift amount with respect to a correction angle from becoming too large. At the same time, it is necessary that the third lens group G3 as a whole maintains appropriate power. Therefore, it is desirable that the negative fixed lens group G3k is arranged to balance power in the third lens group G3. Especially, when it is necessary to maintain long back focus in a zoom lens, as in the zoom lens of the present invention, it is desirable that the third lens group G3 has weak positive refractive power as a whole. Therefore, it is necessary to arrange the negative fixed lens group G3k having sufficiently strong refractive power to increase the power of the shift lens group G3s.

<Composition Limiting Third Lens Group>

It is desirable that the third lens group is composed of 3a lens group G3a, 3b lens group G3b, and 3c lens group G3c, which are arranged in this order from the object side. Further, the 3a lens group G3a may have positive or negative refractive power as a whole, and be composed of at least one positive lens and at least one negative lens. The 3b lens group G3b may have positive refractive power as a whole, and consist of only two lenses of a positive lens and a negative lens. The 3c lens group G3c may have negative refractive power. Further, the 3b lens group G3b is moved in a direction perpendicular to the optical axis to shift, in the direction perpendicular to the optical axis, optical image Hk formed through the zoom lens.

As described above, the fixed lens group, which has opposite power (positive or negative) to the power of the shift lens group, is arranged in the third lens group G3. Specifically, the 3c lens group G3c having negative refractive power, and which is a fixed lens group, is arranged on the image side of the 3b lens group G3b, which is a shift lens group. Therefore, it is possible to balance the shift amount of the 3b lens group G3b, which is the shift lens group G3s, and the refractive power of the third lens group G3 as a whole. Further, it is possible to correct aberrations in an excellent manner.

Further, since the 3a lens group G3a, which is the fixed lens group, is arranged in the third lens group G3, it is possible to correct spherical aberrations and chromatic aberrations in an excellent manner when zoom setting is in the vicinity of wide angle end.

More specifically, for example, when a hand-shake blur in the rotation direction of 0.3° is generated when zoom setting is at telephoto end, the parallel eccentricity shift amount of the shift lens group is 0.55 mm in Example 6, and 0.53 mm in Example 7.

SPECIFIC EXAMPLES

Next, with reference to FIGS. 2A, 2B through 9A, 9B and Tables 1 through 9, numerical data or the like related to the zoom lenses of the present invention in Examples 1 through 8 will be described.

In FIGS. 2A, 2B through 9A, 9B, the same signs as those in FIGS. 1A, 1B, which illustrates the zoom lens 100, represent elements corresponding to the elements in FIGS. 1A, 1B.

FIGS. 2A, 2B through 9A, 9B are schematic cross sections illustrating the structure of the zoom lenses in Examples 1 through 8, respectively.

FIGS. 2A through 9A are diagrams illustrating the state of the zoom lenses in detail when zoom setting is at telephoto end. FIGS. 2B through 9B are diagrams illustrating the state of the zoom lenses when zoom setting is at wide angle end and the state of the zoom lenses when zoom setting is at wide angle end in comparison. In FIGS. 2B through 9B, the upper section (W) illustrates the state in which zoom setting is at wide angle end, and the lower section (T) illustrates the state in which zoom setting is at telephoto end.

In FIGS. 2A through 9A, signs L1, L2 . . . represent lenses in the zoom lenses, and the numbers in the signs correspond to the order of arrangement of the lenses from the object side of the zoom lens.

Tables 1 through 8 show basic data about the zoom lenses in Examples 1 through 8. In Tables 1 through 8, the upper section (a) shows lens data, and the lower section (b) shows brief specifications of the zoom lenses.

Further, the right section (c) of Table 6, which corresponds to Example 6, shows aspheric coefficients of each lens surface corresponding to surface number Si in the basic lens data (a).

Here, the following aspheric surface equation is used:

$$Z = \frac{Y^2/R}{1+\left(1-K\frac{Y^2}{R^2}\right)^{1/2}} + \sum_{i=3}^{n} AiY^i, \quad \text{[EQUATION 1]}$$

where

Z: the depth of an aspheric surface (the length of a perpendicular from a point on the aspheric surface at height Y to a flat plane in contact with the vertex of the aspheric surface, the flat plane being perpendicular to an optical axis) (mm), Y: height (a distance from the optical axis) (mm), R: a paraxial radius of curvature (mm), and K, Ai: aspheric coefficient (i=3 through n).

In the examples other than Example 6, all surfaces of the lenses constituting the respective zoom lenses are spherical or flat.

Further, Table 9 shows values obtained by in equations represented by the formulas (1) through (7). Table 9 shows values for the zoom lenses in Examples 1 through 8 (values calculated for respective examples by using arithmetic expressions in the in equations, or values corresponding to constants in the optical system represented by signs in the in equations).

The upper sections of Tables 1 through 8 show basic lens data (a). In the basic lens data (a), surface number Si is the number of an i-th lens surface or the like (i=1, 2, 3 . . . ). The surface number of the most-object-side surface is 1, and the surface numbers Si sequentially increase from the object side toward the image side. The lens data include aperture stop St.

Further, radius Ri of curvature is the radius of curvature of the i-th surface (i=1, 2, 3 . . . ). Distance Di between surfaces (i=1, 2, 3 . . . ) is a distance, on optical axis Z1, between the i-th surface and (i+1)th surface. The sign Ri and the sigh Di in the lens data correspond to the sign Si, representing the lens surface or the like, (i=1, 2, 3 . . . ).

Further, the column of distance Di between surfaces (i=1, 2, 3 . . . ) shows values representing distance between surfaces and signs Dn (n is a numerical value). The sign Dn corresponds to a distance (air space) between surfaces of different lens groups, and the distance represented by the sign Dn changes when the zoom magnification is changed.

Further, the basic lens data show refractive index Ndj of a j-th optical element (j=1, 2, 3 . . . ) with respect to d-line (wavelength is 587.6 nm). The most object-side optical element is the first optical element, and the number of j sequentially increases from the object side toward the image side. Further, the lens data show Abbe number vdj of the j-th optical element with respect to d-line.

In the lens data of Table 1 through 8, the radius of curvature and the distance between surfaces are represented by the unit of mm. The radius of curvature is positive when the surface is convex toward the object side. The radius of curvature is negative when the surface is convex toward the image side.

The lower sections of Tables 1 through 8 show data about zooming (b). The data about zooming (b) show values, such as focal length f of the entire system of a zoom lens, F-number Fno, full angle 2ω of view, and distances D8, D15, D20, D27 or the like between lens groups, at wide angle end and at telephoto end.

Tables 1 through 9 are provided at the end of "DESCRIPTION OF THE PREFERRED EMBODIMENTS".

FIGS. 10A through 10H, FIGS. 11A through 11H, FIGS. 12A through 12H, FIGS. 13A through 13H, FIGS. 14A through 14H, FIGS. 15A through 15H, FIGS. 16A through 16H, and FIGS. 17A through 17H illustrate various aberrations of the zoom lenses in Examples 1 through 8, respectively.

FIGS. 10A through 17H illustrate aberrations with respect to light with the wavelengths of 587.6 nm, 460.0 nm, and 615.0 nm.

FIGS. 10A through 10D, FIGS. 11A through 11D, FIGS. 12A through 12D, FIGS. 13A through 13D, FIGS. 14A through 14D, FIGS. 15A through 15D, FIGS. 16A through 16D, and FIGS. 17A through 17D illustrate various aberrations (spherical aberration, astigmatism, distortion, and lateral chromatic aberration, respectively) at wide angle end for the zoom lenses in Examples 1 through 8. FIGS. 10E through 10H, FIGS. 11E through 11H, FIGS. 12E through 12H, FIGS. 13E through 13H, FIGS. 14E through 14H, FIGS. 15E through 15H, FIGS. 16E through 16H, and FIGS. 17E through 17H illustrate various aberrations (spherical aberration, astigmatism, distortion, and lateral chromatic aberration, respectively) at telephoto end for the zoom lenses in Examples 1 through 8.

In the diagrams illustrating distortions, a shift amount (difference) from ideal image height f×tan θ is illustrated when focal length of the entire system of the zoom lens is f, and a half angle of view is θ (variable, 0≤θ≤ω).

As the numerical value data related to Examples 1 through 8 and the diagrams illustrating aberrations in Examples 1 through 8 clearly indicate, the zoom lens of the present invention can achieve a wide angle of view and high variable magnification at the same time without increasing the size of the apparatus, while suppressing aberrations.

The zoom lenses in Examples 6 and 7 can correct handshake blurs. In Examples 6 and 7, the fixed lens group G3k in the third lens group G3 is fixed, and the shift lens group G3s in the third lens group G3 is held in such a manner to be movable in a direction perpendicular to the optical axis. Therefore, when the whole imaging apparatus on which the zoom lens is mounted vibrates, or is shaken, it is possible to prevent a shift in the position of optical image Hk representing subject H, and which is formed on a light receiving plane 210J through the zoom lens, with respect to the light receiving plane 210J. In other words, it is possible to prevent a handshake blur when the subject H is photographed by a hand-held imaging apparatus.

Figure 18:
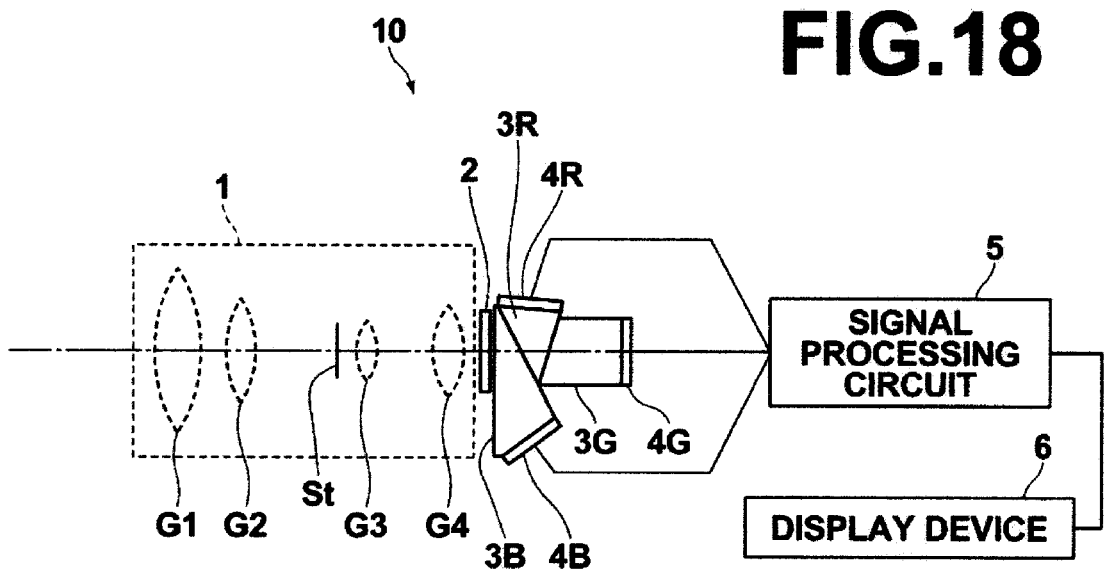
FIG. 18 is a diagram illustrating a video camera using a zoom lens of the present invention.

FIG. 18 is a schematic diagram illustrating the configuration of a video camera, as an example of an imaging apparatus using the zoom lens of the present invention. FIG. 18 schematically illustrates first lens group G1, second lens group G2, aperture stop St, third lens group G3, and fourth lens group G4 in a zoom lens 1.

A video camera 10, illustrated in FIG. 18, is a so-called 3CCD-type imaging apparatus including three imaging devices. However, it is not necessary that the imaging apparatus of the present invention is the 3CCD-type imaging apparatus. For example, imaging may be performed for the entire wavelength band by using an imaging device. The video camera 10 includes the zoom lens 1, a filter 2, color separation prisms 3R, 3G, 3B, imaging devices 4R, 4G, 4B, and a signal processing circuit 5. The filter 2 is arranged on the image side of the zoom lens 1, and has a function, such as a low-pass filter and an infrared-ray-cut filter. The color separation prisms 3R, 3G, 3B are arranged on the image side of the filter 2, and imaging devices 4R, 4G, 4B are provided on the end surfaces of the color separation prisms 3R, 3G, 3B, respectively. The imaging devices 4R, 4G, 4B convert an optical image formed through the zoom lens 1 into electrical signals. For example, a CCD (Charge Coupled Device) may be used as the imaging device. The imaging devices 4R, 4G, 4B are arranged in such a manner that the imaging planes of the imaging devices 4R, 4G, 4B coincide with image formation planes of optical images of respective colors, which are formed through the zoom lens 1.

The filter 2 removes unwanted or unnecessary light component from light that has passed through the zoom lens 1. Further, the color separation prisms 3R, 3G, 3B separate the light into red light, green light and blue light, respectively. Further, images are formed on the imaging planes of the imaging devices 4R, 4G, 4B, which correspond to red light, green light and blue light, respectively. Further, signals output from the imaging devices 4R, 4G, 4B are sent to the signal processing circuit 5, and operation processing is performed on the signals to generate color image signals. The color image signals generated in the signal processing circuit 5 are input to a display device 6, and an image is displayed on the display device 6.

The present invention is not limited to the embodiments and the examples, and various modifications are possible without departing from the gist of the present invention. For example, the radius of curvature of each lens, a distance between surfaces, the value of a refractive index, and the like are not limited to the numerical values in the tables, but may be other values.

TABLE 1

EXAMPLE 1

(a)BASIC LENS DATA

| Si (SURFACE NUMBER) | Ri (RADIUS OF CURVATURE) | Di (DISTANCE BETWEEN SURFACES) | Ndj (REFRACTIVE INDEX) | ν dj (ABBE NUMBER) |
|---|---|---|---|---|
| 1 | 495.8662 | 2.00 | 1.805181 | 25.42 |
| 2 | 61.8722 | 5.22 | | |
| 3 | 254.3889 | 4.30 | 1.496999 | 81.54 |
| 4 | −149.6168 | 0.10 | | |
| 5 | 74.0147 | 5.50 | 1.487490 | 70.23 |
| 6 | −4649.7670 | 0.10 | | |
| 7 | 47.5000 | 6.20 | 1.712995 | 53.87 |
| 8 | 758.7485 | D8 | | |
| 9 | 83.6319 | 0.80 | 1.882997 | 40.76 |
| 10 | 9.4908 | 4.50 | | |
| 11 | −39.0578 | 0.70 | 1.834807 | 42.71 |
| 12 | 31.8462 | 0.20 | | |
| 13 | 18.1423 | 3.81 | 1.808095 | 22.76 |
| 14 | −38.1685 | 0.75 | 1.834807 | 42.71 |
| 15 | 1688.8852 | D15 | | |
| 16 | ∞(APERTURE STOP) | 3.50 | | |
| 17 | 91.4644 | 2.00 | 1.846660 | 23.78 |
| 18 | −63.7798 | 4.01 | | |
| 19 | −20.0399 | 0.80 | 2.000694 | 25.46 |

TABLE 1-continued

EXAMPLE 1

| | | | | |
|---|---|---|---|---|
| 20 | −29.0203 | D20 | | |
| 21 | 43.0687 | 3.00 | 1.603112 | 60.64 |
| 22 | −49.2730 | 0.10 | | |
| 23 | 44.3302 | 0.80 | 1.846660 | 23.78 |
| 24 | 16.0677 | 4.21 | 1.496999 | 81.54 |
| 25 | −123.4309 | 0.10 | | |
| 26 | 27.1428 | 3.00 | 1.754999 | 52.32 |
| 27 | 87.0734 | D27 | | |
| 28 | ∞ | 12.80 | 1.701546 | 41.10 |
| 29 | ∞ | 3.55 | 1.516798 | 64.20 |
| 30 | ∞ | 2.21 | | |

(b)DATA ABOUT ZOOM

| SPECIFICATION | WIDE ANGLE END | TELEPHOTO END |
|---|---|---|
| f | 4.57 | 89.10 |
| Fno. | 1.65 | 2.88 (2.33) |
| 2ω | 73.2 | 4.0 |
| D8 | 0.90 | 46.49 |
| D15 | 48.33 | 2.74 |
| D20 | 15.51 | 17.52 |
| D27 | 8.33 | 6.31 |

Fno. VALUE IN PARENTHESES IS A VALUE WHEN APERTURE IS NOT REGULATED

TABLE 2

EXAMPLE 2

(a)BASIC LENS DATA

| Si (SURFACE NUMBER) | Ri (RADIUS OF CURVATURE) | Di (DISTANCE BETWEEN SURFACES) | Ndj (REFRACTIVE INDEX) | ν dj (ABBE NUMBER) |
|---|---|---|---|---|
| 1 | 518.7513 | 2.00 | 1.755199 | 27.51 |
| 2 | 54.9743 | 6.09 | | |
| 3 | 86.7609 | 7.00 | 1.496999 | 81.54 |
| 4 | −212.7918 | 0.25 | | |
| 5 | 56.6780 | 7.70 | 1.496999 | 81.54 |
| 6 | −330.2492 | 0.15 | | |
| 7 | 41.2703 | 4.40 | 1.712995 | 53.87 |
| 8 | 134.3422 | D8 | | |
| 9 | 70.6765 | 0.80 | 1.882997 | 40.76 |
| 10 | 7.8834 | 4.40 | | |
| 11 | −23.1451 | 0.70 | 1.903658 | 31.32 |
| 12 | 50.2828 | 0.20 | | |
| 13 | 19.2171 | 4.50 | 1.922860 | 20.88 |
| 14 | −22.5407 | 0.76 | 1.806100 | 33.27 |
| 15 | 101.3185 | D15 | | |
| 16 | ∞(APERTURE STOP) | 3.20 | | |
| 17 | 61.2722 | 1.20 | 1.922860 | 18.90 |
| 18 | 291.2759 | 2.51 | 1.487490 | 70.23 |
| 19 | −20.9485 | 1.10 | | |
| 20 | −16.6811 | 1.20 | 1.882997 | 40.76 |
| 21 | −31.0092 | D21 | | |
| 22 | 162.9679 | 3.00 | 1.618000 | 63.33 |
| 23 | −24.0090 | 0.10 | | |
| 24 | 38.6400 | 4.21 | 1.496999 | 81.54 |
| 25 | −21.1675 | 0.80 | 2.000694 | 25.46 |
| 26 | −158.5227 | 0.12 | | |
| 27 | 29.9640 | 2.50 | 1.620411 | 60.29 |
| 28 | −153.5412 | D28 | | |
| 29 | ∞ | 12.80 | 1.701546 | 41.10 |
| 30 | ∞ | 3.55 | 1.516798 | 64.20 |
| 31 | ∞ | 4.22 | | |

TABLE 2-continued

EXAMPLE 2

(b)DATA ABOUT ZOOM

| SPECIFICATION | WIDE ANGLE END | TELEPHOTO END |
|---|---|---|
| f | 4.05 | 79.03 |
| Fno. | 1.66 | 2.88 (2.17) |
| 2ω | 78.8 | 4.6 |
| D8 | 1.02 | 36.68 |
| D15 | 37.30 | 1.64 |
| D21 | 15.08 | 16.07 |
| D28 | 4.05 | 3.06 |

Fno. VALUE IN PARENTHESES IS A VALUE WHEN APERTURE IS NOT REGULATED

TABLE 3

EXAMPLE 3

(a)BASIC LENS DATA

| Si (SURFACE NUMBER) | Ri (RADIUS OF CURVATURE) | Di (DISTANCE BETWEEN SURFACES) | Ndj (REFRACTIVE INDEX) | ν dj (ABBE NUMBER) |
|---|---|---|---|---|
| 1 | 330.2428 | 2.50 | 1.805181 | 25.42 |
| 2 | 61.4774 | 4.00 | | |
| 3 | 146.4821 | 4.50 | 1.487490 | 70.23 |
| 4 | −684.6452 | 0.20 | | |
| 5 | 107.3772 | 6.00 | 1.496999 | 81.54 |
| 6 | −221.4854 | 0.20 | | |
| 7 | 47.5000 | 6.50 | 1.712995 | 53.87 |
| 8 | 758.7485 | D8 | | |
| 9 | 85.8549 | 0.80 | 1.882997 | 40.76 |
| 10 | 9.2454 | 4.50 | | |
| 11 | −39.9564 | 0.70 | 1.834807 | 42.71 |
| 12 | 30.8895 | 0.20 | | |
| 13 | 17.3949 | 3.81 | 1.808095 | 22.76 |
| 14 | −38.7563 | 0.75 | 1.834807 | 42.71 |
| 15 | 769.9194 | D15 | | |
| 16 | ∞(APERTURE STOP) | 3.50 | | |
| 17 | 75.7040 | 2.00 | 1.846660 | 23.78 |
| 18 | −99.5530 | 2.07 | | |
| 19 | −17.7979 | 0.80 | 2.000694 | 25.46 |
| 20 | −22.1112 | D20 | | |
| 21 | 35.0500 | 3.00 | 1.603112 | 60.64 |
| 22 | −52.3421 | 0.10 | | |
| 23 | 25.1829 | 0.80 | 1.846660 | 23.78 |
| 24 | 12.4429 | 4.21 | 1.496999 | 81.54 |
| 25 | 339.9522 | 0.10 | | |
| 26 | 38.8547 | 3.00 | 1.754999 | 52.32 |
| 27 | 76.6615 | D27 | | |
| 28 | ∞ | 12.80 | 1.701546 | 41.10 |
| 29 | ∞ | 3.55 | 1.516798 | 64.20 |
| 30 | ∞ | 2.21 | | |

(b)DATA ABOUT ZOOM

| SPECIFICATION | WIDE ANGLE END | TELEPHOTO END |
|---|---|---|
| f | 4.58 | 89.25 |
| Fno. | 1.95 | 2.88 (2.26) |
| 2ω | 73.2 | 4.0 |
| D8 | 0.90 | 48.38 |
| D15 | 50.38 | 2.90 |
| D20 | 15.72 | 16.05 |
| D27 | 7.86 | 7.53 |

Fno. VALUE IN PARENTHESES IS A VALUE WHEN APERTURE IS NOT REGULATED

TABLE 4

EXAMPLE 4

(a) BASIC LENS DATA

| Si (SURFACE NUMBER) | Ri (RADIUS OF CURVATURE) | Di (DISTANCE BETWEEN SURFACES) | Ndj (REFRACTIVE INDEX) | νdj (ABBE NUMBER) |
|---|---|---|---|---|
| 1 | 211.1338 | 2.00 | 1.805181 | 25.42 |
| 2 | 61.7034 | 3.25 | | |
| 3 | 161.8932 | 5.00 | 1.487490 | 70.23 |
| 4 | −382.3715 | 0.01 | | |
| 5 | 77.9088 | 5.00 | 1.496999 | 81.54 |
| 6 | −492.2882 | 0.17 | | |
| 7 | 42.4463 | 6.00 | 1.622992 | 58.16 |
| 8 | 332.0792 | D8 | | |
| 9 | 97.0846 | 0.80 | 1.882997 | 40.76 |
| 10 | 9.5239 | 4.20 | | |
| 11 | −37.0460 | 0.70 | 1.834807 | 42.71 |
| 12 | 33.6906 | 0.20 | | |
| 13 | 18.4461 | 3.81 | 1.808095 | 22.76 |
| 14 | −35.3258 | 0.75 | 1.903658 | 31.32 |
| 15 | −234.2352 | D15 | | |
| 16 | ∞(APERTURE STOP) | 3.50 | | |
| 17 | −382.0524 | 2.00 | 1.688931 | 31.07 |
| 18 | −35.0005 | 3.49 | | |
| 19 | −15.5916 | 0.80 | 1.882997 | 40.76 |
| 20 | −19.3499 | D20 | | |
| 21 | −362.3125 | 2.80 | 1.712995 | 53.87 |
| 22 | −27.3851 | 0.10 | | |
| 23 | 33.8792 | 4.21 | 1.496999 | 81.54 |
| 24 | −34.1547 | 0.80 | 1.922860 | 20.88 |
| 25 | 1688.4348 | 0.10 | | |
| 26 | 27.1698 | 3.20 | 1.622992 | 58.16 |
| 27 | 125.9499 | D27 | | |
| 28 | ∞ | 12.80 | 1.701546 | 41.10 |
| 29 | ∞ | 3.55 | 1.516798 | 64.20 |
| 30 | ∞ | 2.19 | | |

(b) DATA ABOUT ZOOM

| SPECIFICATION | WIDE ANGLE END | TELEPHOTO END |
|---|---|---|
| f | 4.83 | 94.28 |
| Fno. | 1.66 | 2.88 (2.40) |
| 2ω | 69.8 | 3.8 |
| D8 | 0.90 | 45.64 |
| D15 | 47.64 | 2.90 |
| D20 | 19.62 | 22.60 |
| D27 | 8.75 | 5.77 |

Fno. VALUE IN PARENTHESES IS A VALUE WHEN APERTURE IS NOT REGULATED

TABLE 5

EXAMPLE 5

(a) BASIC LENS DATA

| Si (SURFACE NUMBER) | Ri (RADIUS OF CURVATURE) | Di (DISTANCE BETWEEN SURFACES) | Ndj (REFRACTIVE INDEX) | νdj (ABBE NUMBER) |
|---|---|---|---|---|
| 1 | 565.9071 | 2.50 | 1.805181 | 25.42 |
| 2 | 53.0460 | 4.00 | | |
| 3 | 217.0424 | 4.40 | 1.487490 | 70.23 |
| 4 | −149.5713 | 0.10 | | |
| 5 | 55.9118 | 6.50 | 1.487490 | 70.23 |
| 6 | −260.7301 | 0.10 | | |
| 7 | 41.6781 | 5.40 | 1.712995 | 53.87 |
| 8 | 386.3808 | D8 | | |
| 9 | 121.0378 | 0.70 | 1.834807 | 42.71 |
| 10 | 8.9474 | 4.30 | | |
| 11 | −36.1415 | 0.70 | 1.785896 | 44.20 |
| 12 | 27.9279 | 0.15 | | |
| 13 | 16.3671 | 3.60 | 1.805181 | 25.42 |
| 14 | −28.5563 | 0.71 | 1.785896 | 44.20 |
| 15 | 150.6530 | D15 | | |
| 16 | ∞(APERTURE STOP) | 3.20 | | |
| 17 | 123.5123 | 1.70 | 1.846660 | 23.78 |
| 18 | −53.8546 | 2.24 | | |
| 19 | −17.2584 | 0.70 | 1.903658 | 31.32 |
| 20 | −24.3648 | D20 | | |
| 21 | 511.6306 | 3.00 | 1.603112 | 60.64 |
| 22 | −22.4037 | 0.10 | | |
| 23 | 35.3710 | 4.41 | 1.487490 | 70.23 |
| 24 | −20.6691 | 0.75 | 1.846660 | 23.78 |
| 25 | 539.7431 | 0.10 | | |
| 26 | 24.0122 | 3.50 | 1.712995 | 53.87 |
| 27 | 399.5540 | D27 | | |
| 28 | ∞ | 12.80 | 1.701546 | 41.10 |
| 29 | ∞ | 3.55 | 1.516798 | 64.20 |
| 30 | ∞ | 2.20 | | |

(b) DATA ABOUT ZOOM

| SPECIFICATION | WIDE ANGLE END | TELEPHOTO END |
|---|---|---|
| f | 4.57 | 59.37 |
| Fno. | 1.65 | 2.88 (1.70) |
| 2ω | 73.0 | 6.0 |
| D8 | 0.85 | 35.75 |
| D15 | 37.81 | 2.91 |
| D20 | 18.61 | 19.26 |
| D27 | 6.44 | 5.78 |

Fno. VALUE IN PARENTHESES IS A VALUE WHEN APERTURE IS NOT REGULATED

TABLE 6

EXAMPLE 6

(a) BASIC LENS DATA

| Si (SURFACE NUMBER) | Ri (RADIUS OF CURVATURE) | Di (DISTANCE BETWEEN SURFACES) | Ndj (REFRACTIVE INDEX) | νdj (ABBE NUMBER) |
|---|---|---|---|---|
| 1 | −322.5850 | 2.00 | 1.805181 | 25.42 |
| 2 | 80.8768 | 5.92 | | |
| 3 | 1009.7182 | 6.30 | 1.487490 | 70.23 |
| 4 | −84.3103 | 0.10 | | |
| 5 | 88.5025 | 6.50 | 1.496999 | 81.54 |
| 6 | −279.8801 | 0.10 | | |
| 7 | 45.9429 | 6.00 | 1.754999 | 52.32 |
| 8 | 234.9593 | D8 | | |
| 9 | 56.7001 | 0.85 | 1.882997 | 40.76 |
| 10 | 8.7015 | 4.50 | | |
| 11 | −28.6757 | 0.70 | 1.834807 | 42.71 |
| 12 | 44.4760 | 0.20 | | |
| 13 | 18.3892 | 4.81 | 1.805181 | 25.42 |
| 14 | −17.3314 | 0.80 | 1.834807 | 42.71 |
| 15 | 375.2044 | D15 | | |
| 16 | ∞(APERTURE STOP) | 3.50 | | |
| 17 | 45.7184 | 0.81 | 1.805181 | 25.42 |
| 18 | 13.2809 | 3.00 | 1.922860 | 20.88 |
| 19 | 45.9938 | 2.50 | | |
| 20 | 92.5283 | 1.00 | 1.922860 | 18.90 |
| 21 | 33.3587 | 0.80 | | |
| *22 | 23.2017 | 4.00 | 1.690980 | 52.97 |
| *23 | −32.7215 | 2.50 | | |
| 24 | −24.4779 | 0.80 | 1.712995 | 53.87 |
| 25 | 205.5036 | D25 | | |
| 26 | −1292.6634 | 2.80 | 1.516330 | 64.14 |
| 27 | −25.2528 | 0.10 | | |
| 28 | 41.5849 | 4.11 | 1.620411 | 60.29 |
| 29 | −20.1408 | 0.80 | 1.846660 | 23.78 |
| 30 | −136.7058 | 0.10 | | |

TABLE 6-continued

EXAMPLE 6

| | | | | |
|---|---|---|---|---|
| 31 | 43.8526 | 2.80 | 1.712995 | 53.87 |
| 32 | −155.6717 | D32 | | |
| 33 | ∞ | 12.80 | 1.701546 | 41.10 |
| 34 | ∞ | 3.55 | 1.516798 | 64.20 |
| 35 | ∞ | 2.21 | | |

(b) DATA ABOUT ZOOM

| SPECIFICATION | WIDE ANGLE END | TELEPHOTO END |
|---|---|---|
| f | 4.07 | 79.46 |
| Fno. | 1.66 | 2.88 (2.04) |
| 2ω | 80.0 | 4.5 |
| D8 | 0.90 | 44.76 |
| D15 | 45.45 | 1.59 |
| D25 | 12.46 | 12.59 |
| D32 | 6.82 | 6.69 |

(c) ASPHERIC DATA

ASPHERIC COEFFICIENT

| | S22 |
|---|---|
| κ | 0.98850877 |
| A3 | 1.1550823E−04 |
| A4 | −6.7184844E−06 |
| A5 | −6.0432039E−06 |
| A6 | 6.2240179E−07 |
| A7 | 1.6828420E−07 |
| A8 | −3.5332754E−08 |
| A9 | 1.7490082E−09 |
| A10 | 2.9543259E−11 |

| | S23 |
|---|---|
| κ | 1.00067816 |
| A3 | 1.3910978E−04 |
| A4 | −1.7984312E−06 |
| A5 | 1.0013732E−06 |
| A6 | −5.1482595E−07 |
| A7 | 5.6552448E−08 |
| A8 | 3.8484238E−08 |
| A9 | −8.4757381E−09 |
| A10 | 5.0041292E−10 |

ASPHERIC SURFACE
Fno. VALUE IN PARENTHESES IS A VALUE WHEN APERTURE IS NOT REGULATED

TABLE 7

EXAMPLE 7

(a) BASIC LENS DATA

| Si (SURFACE NUMBER) | Ri (RADIUS OF CURVATURE) | Di (DISTANCE BETWEEN SURFACES) | Ndj (REFRACTIVE INDEX) | νdj (ABBE NUMBER) |
|---|---|---|---|---|
| 1 | −218.5520 | 2.00 | 1.805181 | 25.42 |
| 2 | 77.7717 | 6.22 | | |
| 3 | 261.9329 | 6.60 | 1.603112 | 60.64 |
| 4 | −105.2173 | 0.10 | | |
| 5 | 63.9117 | 8.90 | 1.496999 | 81.54 |
| 6 | −157.0037 | 0.10 | | |
| 7 | 41.8417 | 5.10 | 1.772499 | 49.60 |
| 8 | 97.5088 | D8 | | |
| 9 | 40.5823 | 0.85 | 1.882997 | 40.76 |
| 10 | 7.7690 | 4.75 | | |
| 11 | −28.0381 | 0.70 | 1.834807 | 42.71 |
| 12 | 36.3338 | 0.20 | | |
| 13 | 16.6403 | 4.40 | 1.808095 | 22.76 |
| 14 | −22.8903 | 0.81 | 1.806098 | 40.92 |
| 15 | 99.1765 | D15 | | |
| 16 | ∞(APERTURE STOP) | 3.50 | | |
| 17 | 54.4593 | 0.86 | 1.487490 | 70.23 |
| 18 | 12.6119 | 2.50 | 1.922860 | 20.88 |
| 19 | 18.8616 | 2.50 | | |
| 20 | 23.6069 | 1.00 | 1.846660 | 23.78 |
| 21 | 13.2882 | 5.51 | 1.603112 | 60.64 |
| 22 | −36.8897 | 2.50 | | |
| 23 | −13.7914 | 1.00 | 1.846660 | 23.78 |
| 24 | −18.5718 | D24 | | |
| 25 | 224.0202 | 3.20 | 1.516330 | 64.14 |
| 26 | −25.7384 | 0.10 | | |
| 27 | 41.5952 | 3.71 | 1.620411 | 60.29 |
| 28 | −23.4827 | 0.80 | 1.846660 | 23.78 |
| 29 | −167.1463 | 0.10 | | |
| 30 | 42.8057 | 2.60 | 1.603112 | 60.64 |
| 31 | 688.1782 | D31 | | |
| 32 | ∞ | 12.80 | 1.701546 | 41.10 |
| 33 | ∞ | 3.55 | 1.516798 | 64.20 |
| 34 | ∞ | 2.22 | | |

(b) DATA ABOUT ZOOM

| SPECIFICATION | WIDE ANGLE END | TELEPHOTO END |
|---|---|---|
| f | 4.01 | 78.14 |
| Fno. | 1.66 | 2.89 (1.95) |
| 2ω | 80.6 | 4.6 |
| D8 | 0.90 | 39.86 |
| D15 | 41.11 | 2.15 |
| D24 | 10.37 | 10.22 |
| D31 | 5.90 | 6.05 |

Fno. VALUE IN PARENTHESES IS A VALUE WHEN APERTURE IS NOT REGULATED

TABLE 8

EXAMPLE 8

(a) BASIC LENS DATA

| Si (SURFACE NUMBER) | Ri (RADIUS OF CURVATURE) | Di (DISTANCE BETWEEN SURFACES) | Ndj (REFRACTIVE INDEX) | νdj (ABBE NUMBER) |
|---|---|---|---|---|
| 1 | −2703.4830 | 1.66 | 1.805181 | 25.42 |
| 2 | 61.3919 | 8.70 | | |
| 3 | 551.8138 | 3.50 | 1.496999 | 81.54 |
| 4 | −130.9192 | 0.08 | | |
| 5 | 66.6148 | 6.50 | 1.496999 | 81.54 |
| 6 | −110.8233 | 0.08 | | |
| 7 | 41.6537 | 4.30 | 1.754999 | 52.32 |
| 8 | 121.9204 | D8 | | |
| 9 | 49.6057 | 0.80 | 1.882997 | 40.76 |
| 10 | 8.2745 | 4.30 | | |
| 11 | −29.5032 | 0.70 | 1.834807 | 42.71 |
| 12 | 32.3146 | 0.20 | | |
| 13 | 17.1064 | 3.41 | 1.808095 | 22.76 |
| 14 | −33.3742 | 0.75 | 1.834807 | 42.71 |
| 15 | −446.4058 | D15 | | |
| 16 | ∞(APERTURE STOP) | 3.50 | | |
| 17 | 163.6093 | 2.00 | 1.755199 | 27.51 |
| 18 | −40.1406 | 0.80 | | |
| 19 | −19.2400 | 0.80 | 1.712995 | 53.87 |
| 20 | −27.9517 | D20 | | |
| 21 | 34.7256 | 3.00 | 5.487490 | 70.23 |
| 22 | −48.4289 | 0.10 | | |
| 23 | 32.5097 | 0.80 | 1.922860 | 20.88 |
| 24 | 15.4269 | 4.21 | 1.496999 | 81.54 |
| 25 | −389.6891 | 0.10 | | |
| 26 | 31.9073 | 3.00 | 1.712995 | 53.87 |
| 27 | 106.8630 | D27 | | |
| 28 | ∞ | 12.80 | 1.701546 | 41.10 |
| 29 | ∞ | 3.55 | 1.516798 | 64.20 |
| 30 | ∞ | 2.21 | | |

TABLE 8-continued

EXAMPLE 8

(b)DATA ABOUT ZOOM

| SPECIFICATION | WIDE ANGLE END | TELEPHOTO END |
|---|---|---|
| f | 4.60 | 89.80 |
| Fno. | 1.86 | 3.20 (2.68) |
| 2ω | 72.8 | 4.0 |
| D8 | 0.90 | 42.19 |
| D15 | 43.72 | 2.43 |
| D20 | 18.62 | 21.77 |
| D27 | 8.95 | 5.81 |

Fno. VALUE IN PARENTHESES IS A VALUE WHEN APERTURE IS NOT REGULATED

TABLE 9

| FORMULA No | ARITHMETIC EXPRESSION IN INEQUATION | VALUE CALCULATED BY ARITHMETIC EXPRESSION IN INEQUATION | | | | | | | |
|---|---|---|---|---|---|---|---|---|---|
| | | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| (1) | $(R11r + R11f)/(R11r - R11f)$ | −1.29 | −1.24 | −1.46 | −1.83 | −1.21 | −0.60 | −0.48 | −0.96 |
| (2) | $f11/f1$ | −1.47 | −1.69 | −1.50 | −1.77 | −1.47 | −1.43 | −1.39 | −1.46 |
| (3) | $vd1p$ | 81.6 | 81.6 | 81.6 | 81.6 | 70.2 | 81.6 | 81.6 | 81.6 |
| (4) | $f2/fw$ | −2.54 | −2.17 | −2.50 | −2.47 | −2.37 | −2.58 | −2.31 | −2.64 |
| (5) | $f1/ft$ | 0.67 | 0.60 | 0.70 | 0.65 | 0.83 | 0.70 | 0.65 | 0.65 |
| (6) | $D2/TL1$ | 0.22 | 0.22 | 0.17 | 0.15 | 0.17 | 0.22 | 0.21 | 0.35 |
| (7) | $f3/f4$ | 5.05 | 3.47 | 4.24 | 5.20 | 5.76 | 4.13 | 2.72 | 3.27 |

What is claimed is:

1. A zoom lens comprising:
a first lens group having positive refractive power, and which is fixed with respect to the direction of an optical axis during zooming;
a second lens group having negative refractive power, and which is moved in the direction of the optical axis during zooming;
a third lens group having positive refractive power, and which is fixed with respect to the direction of the optical axis during zooming; and
a fourth lens group having positive refractive power, and which is moved in the direction of the optical axis during zooming in such a manner that a fluctuation of the position of an image plane caused by zooming is corrected so that the zoom lens is focused, and the first lens group, the second lens group, the third lens group and the fourth lens group being arranged in this order from the object side of the zoom lens,
wherein the first lens group consists of four lenses of a first-group first lens having negative refractive power, a first-group second lens having positive refractive power, a first-group third lens having positive refractive power, and a first-group fourth lens having positive refractive power, which are arranged in this order from the object side, and
wherein the first-group first lens and the first-group second lens are arranged in such a manner that a space is formed therebetween, and
wherein the following formulae (1') and (6') are satisfied:

$$-1.9<(R11r+R11f)/(R11r-R11f)<-0.4 \quad (1')$$

$$0.13<D2/TL1<0.38 \quad (6'),$$

where
R11f is a radius of curvature of an object-side surface of the first-group first lens,
R11r is a radius of curvature of an image-side surface of the first-group first lens,
D2 is a spatial interval between the first group first lens and the first group second lens, and
TL1 is the thickness of the first lens group,
wherein the following formula (4) is satisfied:

$$-2.9<f2/fw<-1.8 \quad (4),$$

where
fw is the focal length of the entire system of the zoom lens at wide angle end, and
f2 is the focal length of the second lens group.

2. A zoom lens, as defined in claim 1, wherein the first lens group satisfies the following formula (2):

$$-2.0<f11/f1<-1.2 \quad (2),$$

where
f1 is the focal length of the first lens group, and,
f11 is the focal length of the first-group first lens.

3. A zoom lens, as defined in claim 1, wherein an Abbe number of at least one of the lenses having positive refractive power in the first lens group with respect to d-line satisfies the following formula (3):

$$65<vd1p \quad (3),$$

where
vd1p is the Abbe number of at least one of the lenses having positive refractive power in the first lens group with respect to d-line.

4. A zoom lens, as defined in claim 1, wherein the following formula (5) is satisfied:

$$0.55<f1/ft<0.88 \quad (5),$$

where
ft is the focal length of the entire system of the zoom lens at telephoto end, and
f1 is the focal length of the first lens group.

5. A zoom lens, as defined in claim 1, wherein the second lens group consists of three lenses having negative refractive power and a lens having positive refractive power.

6. A zoom lens, as defined in claim 1, wherein the second lens group consists of:
a second-group first lens having negative refractive power,
a second-group second lens having negative refractive power,
a second-group third lens having positive refractive power, and a second-group fourth lens having negative refractive power, which are arranged in this order from the object side.

7. A zoom lens, as defined in claim 1, wherein the following formula (7) is satisfied:

$$2.5 < f3/f4 < 6.0 \qquad (7),$$

where
f3 is the focal length of the third lens group, and
f4 is the focal length of the fourth lens group.

8. A zoom lens, as defined in claim 1, wherein the fourth lens group consists of three lenses having positive refractive power and a lens having negative refractive power.

9. A zoom lens, as defined in claim 1,
wherein the third lens group includes a shift lens group that is moved in a direction perpendicular to the optical axis to shift, in the direction perpendicular to the optical axis, an optical image formed through the zoom lens and a fixed lens group that is fixed with respect to the direction perpendicular to the optical axis, and
wherein the shift lens group has positive refractive power as a whole, and consists of two lenses of a lens having positive refractive power and a lens having negative refractive power, and
wherein the fixed lens group has negative refractive power as a whole.

10. A zoom lens, as defined in claim 1,
wherein the third lens group consists of a 3a lens group, a 3b lens group, and a 3c lens group, which are arranged in this order from the object side, and
wherein the 3a lens group consists of at least one lens having positive refractive power and at least one lens having negative refractive power, and
wherein the 3b lens group has positive refractive power as a whole, and consists of two lenses of a lens having positive refractive power and a lens having negative refractive power, and
wherein the 3c lens group has negative refractive power, and
wherein the 3b lens group is moved in a direction perpendicular to the optical axis to shift, in the direction perpendicular to the optical axis, an optical image formed through the zoom lens.

11. A zoom lens, as defined in claim 2, wherein an Abbe number of at least one of the lenses having positive refractive power in the first lens group with respect to d-line satisfies the following formula (3):

$$65 < vd1p \qquad (3),$$

where
vd1p is the Abbe number of at least one of the lenses having positive refractive power in the first lens group with respect to d-line.

12. A zoom lens, as defined in claim 11, wherein the following formula (5) is satisfied:

$$0.55 < f1/ft < 0.88 \qquad (5),$$

where
ft is the focal length of the entire system of the zoom lens at telephoto end, and
f1 is the focal length of the first lens group.

13. A zoom lens, as defined in claim 12, wherein the second lens group consists of three lenses having negative refractive power and a lens having positive refractive power.

14. A zoom lens, as defined in claim 13, wherein the second lens group consists of a second-group first lens having negative refractive power, a second-group second lens having negative refractive power, a second-group third lens having positive refractive power, and a second-group fourth lens having negative refractive power, which are arranged in this order from the object side.

15. A zoom lens, as defined in claim 14, wherein the first lens group satisfies the following formula (6):

$$0.1 < D2/TL1 < 0.4 \qquad (6),$$

where
D2 is an air space between the first-group first lens and the first-group second lens, and
TL1 is the thickness of the first lens group.

16. A zoom lens, as defined in claim 15, wherein the following formula (7) is satisfied:

$$2.5 < f3/f4 < 6.0 \qquad (7),$$

where
f3 is the focal length of the third lens group, and
f4 is the focal length of the fourth lens group.

17. A zoom lens, as defined in claim 16, wherein the fourth lens group consists of three lenses having positive refractive power and a lens having negative refractive power.

18. A zoom lens, as defined in claim 17,
wherein the third lens group includes a shift lens group that is moved in a direction perpendicular to the optical axis to shift, in the direction perpendicular to the optical axis, an optical image formed through the zoom lens and a fixed lens group that is fixed with respect to the direction perpendicular to the optical axis, and
wherein the shift lens group has positive refractive power as a whole, and consists of two lenses of a lens having positive refractive power and a lens having negative refractive power, and
wherein the fixed lens group has negative refractive power as a whole.

19. A zoom lens, as defined in claim 17,
wherein the third lens group consists of a 3a lens group, a 3b lens group, and a 3c lens group, which are arranged in this order from the object side, and
wherein the 3a lens group consists of at least one lens having positive refractive power and at least one lens having negative refractive power, and
wherein the 3b lens group has positive refractive power as a whole, and consists of two lenses of a lens having positive refractive power and a lens having negative refractive power, and
wherein the 3c lens group has negative refractive power, and
wherein the 3b lens group is moved in a direction perpendicular to the optical axis to shift, in the direction perpendicular to the optical axis, an optical image formed through the zoom lens.

20. An imaging apparatus comprising:
a zoom lens, as defined in claim 1.

21. A zoom lens comprising:
a first lens group having positive refractive power, and which is fixed with respect to the direction of an optical axis during zooming;
a second lens group having negative refractive power, and which is moved in the direction of the optical axis during zooming;
a third lens group having positive refractive power, and which is fixed with respect to the direction of the optical axis during zooming; and a fourth lens group having positive refractive power, and which is moved in the direction of the optical axis during zooming in such a manner that a fluctuation of the position of an image plane caused by zooming is corrected so that the zoom lens is focused, and the first lens group, the second lens group, the third lens group and the fourth lens group being arranged in this order from the object side of the zoom lens, wherein the first lens group consists of four lenses of a first-group first lens having negative refractive power, a first-group second lens having positive refractive power, a first-group third lens having positive refractive power, and a first-group fourth lens having positive refractive power, which are arranged in this order from the object side, and wherein the first-group first lens and the first-group second lens are arranged in such a manner that a space is formed therebetween, and wherein the following formulae (1') and (6') are satisfied:

$$-1.9 < (R11r + R11f)/(R11r - R11f) < -0.4 \tag{1'}$$

$$0.13 < D2/TL1 < 0.38 \tag{6'}$$

where
 R11f is a radius of curvature of an object-side surface of the first-group first lens,
 R11r is a radius of curvature of an image-side surface of the first-group first lens,
 D2 is a spatial interval between the first group first lens and the first group second lens, and
 TL1 is the thickness of the first lens group, wherein the following formula (7) is satisfied:

$$2.5 < f3/f4 < 6.0 \tag{7}$$

where
 f3 is the focal length of the third lens group, and
 f4 is the focal length of the fourth lens group.

* * * * *